US011966910B2

(12) United States Patent
Li et al.

(10) Patent No.: US 11,966,910 B2
(45) Date of Patent: Apr. 23, 2024

(54) AUTOMATIC ROUTING METHOD FOR SE AND ELECTRONIC DEVICE

(71) Applicant: Huawei Technologies Co., Ltd., Shenzhen (CN)

(72) Inventors: Zhuofei Li, Beijing (CN); Jiahao Zhen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 406 days.

(21) Appl. No.: 17/440,530

(22) PCT Filed: Apr. 20, 2020

(86) PCT No.: PCT/CN2020/085520
§ 371 (c)(1),
(2) Date: Sep. 17, 2021

(87) PCT Pub. No.: WO2020/216160
PCT Pub. Date: Oct. 29, 2020

(65) Prior Publication Data
US 2022/0156718 A1   May 19, 2022

(30) Foreign Application Priority Data

Apr. 26, 2019 (CN) .......................... 201910345528.5
May 21, 2019 (CN) .......................... 201910426179.X

(51) Int. Cl.
G06Q 20/32 (2012.01)
G06Q 20/40 (2012.01)
(52) U.S. Cl.
CPC ....... *G06Q 20/3278* (2013.01); *G06Q 20/326* (2020.05); *G06Q 20/40145* (2013.01); *G06Q 20/4015* (2020.05)

(58) Field of Classification Search
None
See application file for complete search history.

(56) References Cited

U.S. PATENT DOCUMENTS

| 2013/0060959 A1 | 3/2013 | Taveau et al. |
| 2013/0198086 A1 | 8/2013 | Mardikar |

(Continued)

FOREIGN PATENT DOCUMENTS

| CN | 102271012 A | 12/2011 |
| CN | 103065107 A | 4/2013 |

(Continued)

OTHER PUBLICATIONS

Wang, Y., et al., "HCE mobile payment scheme on CL-PKC," Computer Engineering and Design, vol. 38, No. 1, Jan. 2017, with an English Abstract, 6 pages.

(Continued)

*Primary Examiner* — Scott S Trotter
*Assistant Examiner* — Amit Patel
(74) *Attorney, Agent, or Firm* — Conley Rose, P.C.

(57) ABSTRACT

An electronic device including a plurality of SEs, wherein each of the plurality of SEs carries at least one NFC application, and configured to store first identifiers and SE location information indicating an SE that carries a corresponding NFC application of a plurality of NFC applications, receive a transaction instruction, search, in response to that the transaction instruction carries a first identifier, the stored SE location information for SE location information corresponding to the first identifier carried in the transaction instruction, determine a first target SE from at least two SEs based on the SE location information, and send the transaction instruction to the first target SE.

20 Claims, 10 Drawing Sheets

(56) References Cited

U.S. PATENT DOCUMENTS

| | | | |
|---|---|---|---|
| 2014/0256252 A1* | 9/2014 | Geslin | H04B 5/0031 455/41.1 |
| 2015/0020160 A1 | 1/2015 | Goncalves | |
| 2015/0142589 A1 | 5/2015 | Jin et al. | |
| 2020/0280341 A1 | 9/2020 | Zhang | |

FOREIGN PATENT DOCUMENTS

| | | | |
|---|---|---|---|
| CN | 103139373 A | 6/2013 | |
| CN | 103942898 A | 7/2014 | |
| CN | 104115173 A | 10/2014 | |
| CN | 105574723 A | 5/2016 | |
| CN | 105722005 A | 6/2016 | |
| CN | 106101989 A | 11/2016 | |
| CN | 107358432 A | 11/2017 | |
| CN | 107911319 B | 5/2021 | |
| EP | 3291454 A1 | 3/2018 | |
| JP | 2016508677 A | 3/2016 | |
| WO | 2017128516 A1 | 8/2017 | |

OTHER PUBLICATIONS

Urien, P., et al., "Cloud of Secure Elements Perspectives for Mobile and Cloud Applications Security," IEEE Conference on Communications and Network Security, 2013—Poster Session, 2 pages.

* cited by examiner

AUTOMATIC ROUTING METHOD FOR SE AND ELECTRONIC DEVICE

CROSS-REFERENCE TO RELATED APPLICATIONS

This application is a U.S. National Stage of International Patent Application No. PCT/CN2020/085520 filed on Apr. 20, 2020, which claims priority to Chinese Patent Application No. 201910345528.5 filed on Apr. 26, 2019 and Chinese Patent Application No. 201910426179.X filed on May 21, 2019. All of the aforementioned applications are hereby incorporated by reference in their entireties.

TECHNICAL FIELD

Embodiments of this application relate to the field of near field communication (Near Field Communication, NFC) technologies, and in particular, to an automatic routing method for a secure element (Security Element, SE) and an electronic device.

BACKGROUND

NFC is a near field communication technology, and allows non-contact point-to-point data transmission between devices. NFC has relatively high security, and is increasingly popular and accepted by the public in recent years. An electronic device having an NFC function develops particularly rapidly. The electronic device having the NFC function may work in three modes: a card reader mode, a card emulation mode, and a point-to-point mode. The card emulation mode is most frequently used. The electronic device may be emulated as a non-contact integrated circuit (Integrated Circuit. IC) card, and a user may interact with a card reader by holding the electronic device, to complete an operation such as swiping a bank card, swiping a bus card, or swiping a social security card. This brings great convenience to life.

Before the electronic device is emulated as the non-contact IC card to interact with the card reader, the electronic device needs to download a corresponding NFC application to a secure element (Security Element, SE) of the electronic device. The SE may provide a secure execution environment for running the NFC application, and provide a secure storage environment for sensitive data of the NFC application.

Currently, one electronic device may include a plurality of SEs. Usually, a mobile operator tends to use an SE in a form of a subscriber identity module (subscriber identification module, SIM) card, an electronic device manufacturer tends to use an eSE, and an application manufacturer tends to use host-based card emulation (host card emulation, HCE). Usually, an NFC controller of the electronic device may determine, by using a method in which a route points to an SE, an SE that undertakes a current NFC transaction.

One SE may simultaneously carry a plurality of NFC applications. When the NFC applications carried in the SE are activated, the electronic device may be emulated as a corresponding non-contact IC card to interact with a card reader. The NFC applications may be manually activated by the user, or may be automatically activated by the electronic device. Specifically, after receiving a transaction instruction sent by the card reader, the electronic device may determine, based on an application identifier (Application Identifier, AID) carried in the transaction instruction, an NFC application that is carried in the SE and that is to be accessed by the transaction instruction.

Usually, only an SE to which a route of the NFC controller points can undertake an NFC transaction, that is, process the transaction instruction. When the transaction instruction needs to access an NFC application carried in another SE, the transaction cannot be performed. The another SE is not the SE to which the route of the NFC controller points. Therefore, when the electronic device includes a plurality of SEs, how to make the route of the NFC controller point to an SE in which an NFC application to be accessed by the transaction instruction is located is an urgent problem to be resolved.

SUMMARY

Embodiments of this application provide an automatic routing method for an SE and an electronic device. Therefore, even if the electronic device includes a plurality of SEs, the electronic device can be automatically routed to an SE in which an NFC application to be accessed by a transaction instruction is located.

According to a first aspect, an embodiment of this application provides an electronic device. The electronic device includes an NFC controller and at least two SEs, and each of the at least two SEs carries at least one NFC application. The NFC controller stores first identifiers and SE location information of a plurality of NFC applications, and the SE location information indicates an SE that carries a corresponding NFC application. The NFC controller can receive a transaction instruction. The NFC controller may search, in response to a fact that the transaction instruction carries a first identifier, the SE location information stored in the NFC control for SE location information corresponding to the first identifier carried in the transaction instruction. The NFC controller determines a first target SE from the at least two SEs based on the found SE location information, and sends the transaction instruction to the first target SE.

In this embodiment of this application, the NFC controller may store the first identifiers and the SE location information of the plurality of NFC applications. Therefore, after receiving the transaction instruction that carries the first identifier, the electronic device may determine, based on the first identifier carried in the transaction instruction, SE location information of an NFC application to be accessed by the transaction instruction. To be specific, the electronic device may determine an SE in which the NFC application to be accessed by the transaction instruction is carried.

In this embodiment of this application, the NFC controller can be automatically routed, based on the first identifier carried in the transaction instruction, to the SE in which the NFC application to be accessed by the transaction instruction is located.

With reference to the first aspect, in a possible design manner, the first target SE may receive the transaction instruction, and determine, based on the first identifier carried in the transaction instruction, a first target NFC application from NFC applications carried in the first target SE. The first target SE runs the first target NFC application, to execute the transaction instruction.

To be specific, the target SE may send, based on the first identifier carried in the transaction instruction, the transaction instruction to the NFC application to be accessed by the transaction instruction, and the NFC application to be accessed by the transaction instruction executes the transaction instruction, to complete the transaction.

With reference to the first aspect, in another possible design manner, the first identifier may be an AID. Certainly, the first identifier includes but is not limited to the AID.

With reference to the first aspect, m another possible design manner, an NFC management application of the first target NFC application carries a first identifier of the first target NFC application and SE location information of the first target NFC application. The SE location information of the first target NFC application indicates the first target SE that carries the first target NFC application. The NFC management application is configured to manage one or more NFC applications. The NFC controller is configured to receive the first identifier of the first target NFC application and the SE location information of the first target NFC application that are transmitted when the NFC management application of the first target NFC application registers with a default payment application of the electronic device.

During installation, the NFC management application of the first target NFC application registers with the default payment application of the electronic device. The NFC controller is further configured to store the first identifier of the first target NFC application and the SE location information of the first target NFC application.

With reference to the first aspect, in another possible design manner, that the transaction instruction is sent to the first target SE may include: If the first target SE is an SE to which a route of the NFC controller points, the NFC controller may directly transmit the received transaction instruction to the first target SE, the first target SE sends the transaction instruction to the NFC application to be accessed by the transaction instruction, and the NFC application to be accessed by the transaction instruction executes the transaction instruction, to complete the transaction. If the first target SE is not an SE to which a route of the NFC controller points, the NFC controller may modify the route to point to the first target SE, and then transmit the received transaction instruction to the SE, the SE sends the transaction instruction to the NFC application to be accessed by the transaction instruction, and the NFC application to be accessed by the transaction instruction executes the transaction instruction, to complete the transaction.

It may be understood that the SE indicated by the SE location information may or may not be the SE to which the route of the NFC controller points. After finding the SE location information corresponding to the first identifier, the electronic device may determine that the SE indicated by the SE location information is the SE to which the route of the NFC controller points. If the SE indicated by the SE location information is the SE to which the route of the NFC controller points, the NFC controller may directly transmit the received transaction instruction to the SE, the SE sends the transaction instruction to the NFC application to be accessed by the transaction instruction, and the NFC application to be accessed by the transaction instruction executes the transaction instruction, to complete the transaction. If the SE indicated by the SE location information is not the SE to which the route of the NFC controller points, the NFC controller may modify the route to point to the SE, and then transmit the received transaction instruction to the SE, the SE sends the transaction instruction to the NFC application to be accessed by the transaction instruction, and the NFC application to be accessed by the transaction instruction executes the transaction instruction, to complete the transaction.

With reference to the first aspect, in another possible design manner, not all NFC applications support use of the first identifier (for example, the AID). For example, the first identifier is the AID. For example, some bus cards do not support use of the AID. Therefore, the transaction instruction received by the NFC controller of the electronic device does not include the first identifier. Based on this case, a processor of the electronic device may store one or more pieces of use scenario information, one or more pieces of SE location information, and one or more second identifiers of one or more non-standard NFC applications.

For example, the electronic device (for example, the processor of the electronic device) may maintain a non-standard card information table. The non-standard card information table may include query information of a non-standard NFC application installed in the electronic device. The query information of the non-standard NFC application may include use scenario information. SE location information, and a second identifier of the non-standard NFC application.

The non-standard NFC application does not support the AID. The second identifier is used to identify the non-standard NFC application, and the second identifier is not the first identifier (for example, the AID). The use scenario information is used to indicate scenario information of using a corresponding non-standard NFC application.

Specifically, the processor may obtain current scenario information of the electronic device in response to a fact that the transaction instruction received by the NFC controller does not carry the first identifier. The processor searches the one or more pieces of use scenario information of the one or more non-standard NFC applications for use scenario information corresponding to the current scenario information, and determines a second identifier and SE location information that correspond to the found use scenario information. The processor determines a second target SE from the at least two SEs based on the found SE location information, and sends the transaction instruction to the second target SE. The second target SE receives the transaction instruction. The processor indicates the found second identifier to the second target SE. The second target SE determines, based on the second identifier indicated by the processor, a second target NFC application from NFC applications carried in the second target SE, where the second target NFC application is a non-standard NFC application. The second target SE runs the second target NFC application, to execute the transaction instruction.

In this embodiment of this application, even if some NFC applications do not support the AID, after receiving the transaction instruction, the electronic device may determine, based on the current scenario information of the electronic device, an SE in which a non-standard NFC application to be accessed by the transaction instruction is located. Therefore, automatic routing to the SE in which the non-standard NFC application to be accessed by the transaction instruction is located can be implemented.

In addition, the electronic device may further determine, based on the current scenario information of the electronic device, the non-standard NFC application to be accessed by the transaction instruction. In this way, the SE can send the transaction instruction to the non-standard NFC application to be accessed by the transaction instruction.

With reference to the first aspect, in another possible design manner, the NFC controller may store a routing table, where the routing table includes the first identifiers and the SE location information of the plurality of NFC applications. The routing table may further include a non-standard card default item, and the non-standard card default item is used to point to, when the transaction instruction does not carry the first identifier, an SE corresponding to the current scenario information of the electronic device. The processor may determine the second target SE from the at least two SEs based on the found SE location information, and indicates the second target SE to the NFC controller. The NFC controller may configure, in response to the indication of the processor, the non-standard card default item to point to the second target SE. The NFC controller may send the transaction instruction to the second target SE to which the non-standard card default item points.

With reference to the first aspect, in another possible design manner, the second target SE indicated by the SE location information corresponding to the current scenario information may or may not be the SE to which the route of the NFC controller points. After finding the SE location information, the electronic device may determine whether the SE indicated by the SE location information is an SE to which the non-standard card default item in the routing table points. If the SE indicated by the SE location information is the SE to which the non-standard card default item points, the NFC controller may directly transmit the received transaction instruction to the SE, and the SE automatically activates the non-standard NFC application indicated by the identifier corresponding to the current scenario information, and executes the transaction instruction, to complete the transaction. If the SE indicated by the SE location information is not the SE to which the non-standard card default item points, the NFC controller may configure the non-standard card default item in the routing table to point to the SE, and then transmit the received transaction instruction to the SE, and the SE automatically activates the non-standard NFC application indicated by the identifier corresponding to the current scenario information, and executes the transaction instruction, to complete the transaction.

With reference to the first aspect, in another possible design manner, the scenario information includes at least one or more of geographical location information, time information, and operation information. The geographical location information is used to indicate a geographical location at which the corresponding non-standard NFC application can be used; the time information is used to indicate a time for which the corresponding non-standard NFC application can be used; and the operation information is used to indicate an operation performed by a user on the electronic device before the corresponding non-standard NFC application is used.

With reference to the first aspect, in another possible design manner, a first SE in the at least two SEs carries a first NFC application and a second NFC application. An NFC service verification manner supported by the first NFC application is a direct card swiping mode in which user verification does not need to be performed. For example, the first NFC application may be a "bus card" application. An NFC service verification manner supported by the second NFC application is a verification-required mode in which the user verification needs to be performed. For example, the second NFC application may be a "bank card" application. The "bank card" application corresponds to the verification-required mode, and a transaction can be completed only after the user verification (for example, password verification, fingerprint verification, face verification, iris authentication, voiceprint authentication, or behavior authentication) succeeds. The "bus card" application corresponds to the direct card swiping mode, and a transaction can be completed without the user verification.

The processor of the electronic device activates the first NFC application in response to a setting operation of the user, to set the first NFC application as a default NFC application of the electronic device. In response to a preset shortcut operation of the user, the processor deactivates the first NFC application, and automatically activates the second NFC application, to set the second NFC application as a default NFC application of the electronic device.

The foregoing solution may be understood as a concept of "direct card swiping is normal, and verification is temporary" proposed in this embodiment of this application. In the electronic device, the first NFC application may be a normal default NFC application, and the second NFC application may be a temporary default NFC application.

Specifically, usually, the default NFC application of the electronic device may be the first NFC application (the first NFC application may be set as the default NFC application by the user). In this way, the user can complete, at any time by using the electronic device, a transaction with a card reader or a POS terminal corresponding to the first NFC application. When the user expects to use the second NFC application for payment, the user may input a preset shortcut operation to the electronic device. In response to the preset shortcut operation, the electronic device may temporarily set the second NFC application as a default NFC application, so that the electronic device can complete a transaction with a card reader or a POS terminal corresponding to the second NFC application.

In this embodiment of this application, even if one NFC management application manages the first NFC application (for example, the "bus card" application, a "social security card" application, or a "vehicle key" application) in the direct card swiping mode and the second NFC application (for example, the "bank card" application) in the verification-required mode, the user does not need to frequently set a default NFC application in the NFC management application. The electronic device can complete, at any time, the transaction with the card reader or the POS terminal corresponding to the first NFC application, and can complete, in response to the preset shortcut operation, the transaction with the card reader or the POS terminal corresponding to the second NFC application.

According to a second aspect, an embodiment of this application provides an electronic device. The electronic device includes a processor and at least two secure elements SEs; a first SE in the at least two SEs carries a first NFC application and a second NFC application; an NFC service verification manner supported by the first NFC application is a direct card swiping mode in which user verification does not need to be performed; an NFC service verification manner supported by the second NFC application is a verification-required mode in which the user verification needs to be performed; and the user verification is at least any one of password verification, fingerprint verification, face verification, iris authentication, voiceprint authentication, behavior authentication, and the like. The processor activates the first NFC application in response to a setting operation of a user, to set the first NFC application as a default NFC application of the electronic device. In response to a preset shortcut operation of the user, the processor deactivates the first NFC application, and automatically activates the second NFC application, to set the second NFC application as a default NFC application of the electronic device.

According to a third aspect, an embodiment of this application provides an automatic routing method for an SE, and the method is applied to an electronic device. The electronic device includes at least two SEs, and each of the at least two SEs carries at least one NFC application. The electronic device stores first identifiers and SE location information of a plurality of NFC applications, and the SE location information indicates an SE that carries a corresponding NFC application. The method may include: The electronic device receives a transaction instruction. The electronic device searches, in response to a fact that the transaction instruction carries a first identifier, the stored SE location information for SE location information corresponding to the first identifier carried in the transaction instruction. The electronic device determines a first target SE from the at least two SEs based on the SE location information.

With reference to the third aspect, in a possible design manner, the electronic device may further determine, based on the first identifier carried in the transaction instruction, a first target NFC application from NFC applications carried in the first target SE. The electronic device runs the first target NFC application by using the first target SE, to execute the transaction instruction.

With reference to the third aspect, in another possible design manner, the first identifier may be an AID.

With reference to the third aspect, in another possible design manner, an NFC management application of the first target NFC application carries a first identifier of the first target NFC application and SE location information of the first target NFC application; the SE location information of the first target NFC application indicates the first target SE that carries the first target NFC application; and the NFC management application is configured to manage one or more NFC applications. The method may further include: The electronic device obtains the first identifier of the first target NFC application and the SE location information of the first target NFC application that are transmitted when the NFC management application of the first target NFC application registers with a default payment application of the electronic device, where during installation, the NFC management application registers with the default payment application. The electronic device stores the first identifier of the first target NFC application and the SE location information of the first target NFC application.

With reference to the third aspect, in another possible design manner, the electronic device further stores one or more pieces of use scenario information, one or more pieces of SE location information, and one or more second identifiers of one or more non-standard NFC applications: the non-standard NFC application does not support the AID; the second identifier is used to identify the non-standard NFC application, and the second identifier is not the first identifier (for example, the AID); and the use scenario information is used to indicate scenario information of using a corresponding non-standard NFC application. The method may further include: The electronic device obtains current scenario information of the electronic device in response to a fact that the transaction instruction does not carry the first identifier. The electronic device searches the one or more pieces of use scenario information of the one or more non-standard NFC applications for use scenario information corresponding to the current scenario information, and determines a second identifier and SE location information that correspond to the found use scenario information. The electronic device determines a second target SE from the at least two SEs based on the found SE location information. The electronic device determines, based on the found second identifier, a second target NFC application from NFC applications carried in the second target SE. The electronic device runs the second target NFC application by using the second target SE, to execute the transaction instruction.

With reference to the third aspect, in another possible design manner, the electronic device stores a routing table, where the routing table includes the first identifiers and the SE location information of the plurality of NFC applications. The routing table further includes a non-standard card default item, and the non-standard card default item is used to point to, when the transaction instruction does not carry the first identifier, an SE corresponding to the current scenario information of the electronic device. That the electronic device determines a second target SE from the at least two SEs based on the found SE location information includes: The electronic device determines the second target SE from the at least two SEs based on the found SE location information, and configures the non-standard card default item to point to the second target SE.

With reference to the third aspect, in another possible design manner, the scenario information includes at least one or more of geographical location information, time information, and operation information. The geographical location information is used to indicate a geographical location at which the corresponding non-standard NFC application can be used; the time information is used to indicate a time for which the corresponding non-standard NFC application can be used; and the operation information is used to indicate an operation performed by a user on the electronic device before the corresponding non-standard NFC application is used.

With reference to the third aspect, in another possible design manner, a first SE in the at least two SEs carries a first NFC application and a second NFC application; an NFC service verification manner supported by the first NFC application is a direct card swiping mode in which user verification does not need to be performed; an NFC service verification manner supported by the second NFC application is a verification-required mode in which the user verification needs to be performed; and the user verification is at least any one of password verification, fingerprint verification, face verification, iris authentication, voiceprint authentication, behavior authentication, and the like. The method may further include: The electronic device activates the first NFC application in response to a setting operation of the user, to set the first NFC application as a default NFC application of the electronic device. In response to a preset shortcut operation of the user, the electronic device deactivates the first NFC application, and automatically activates the second NFC application, to set the second NFC application as a default NFC application of the electronic device.

With reference to the third aspect, in another possible design manner, after the second NFC application completes a transaction or after a preset time since the electronic device automatically activates the second NFC application, the electronic device deactivates the second NFC application, and automatically activates the first NFC application, to set the first NFC application as a default NFC application of the electronic device.

According to a fourth aspect, an embodiment of this application provides an automatic activation method for an NFC application. The method may be applied to an electronic device. The electronic device includes at least two SEs; a first SE in the at least two SEs carries a first NFC application and a second NFC application; an NFC service verification manner supported by the first NFC application is a direct card swiping mode in which user verification does not need to be performed; an NFC service verification manner supported by the second NFC application is a verification-required mode in which the user verification needs to be performed; and the user verification is at least any one of password verification, fingerprint verification, face verification, iris authentication, voiceprint authentication, behavior authentication, and the like.

The method may include: The electronic device activates the first NFC application in response to a setting operation of a user, to set the first NFC application as a default NFC application of the electronic device. In response to a preset shortcut operation of the user, the electronic device deactivates the first NFC application, and automatically activates the second NFC application, to set the second NFC application as a default NFC application of the electronic device.

With reference to the fourth aspect, in a possible design manner, the method may further include: after the second NFC application completes a transaction or after a preset time since the electronic device automatically activates the second NFC application, the electronic device deactivates the second NFC application, and automatically activates the first NFC application, to set the first NFC application as a default NFC application of the electronic device.

According to a fifth aspect, an embodiment of this application provides an NFC chip. The NFC chip includes an NFC controller; and the NFC controller stores first identifiers and secure element SE location information of a plurality of NFC applications, and the SE location information indicates an SE that carries a corresponding NFC application. The NFC controller receives a transaction instruction. The NFC controller searches, in response to a fact that the transaction instruction carries a first identifier, the SE location information stored in the NFC controller for SE location information corresponding to the first identifier carried in the transaction instruction. The NFC controller determines a first target SE from at least two SEs based on the found SE location information. The NFC controller sends the transaction instruction to the first target SE.

With reference to the fifth aspect, in a possible design manner, the first identifier may be an AID.

With reference to the fifth aspect, in another possible design manner, an NFC management application of a first target NFC application carries a first identifier of the first target NFC application and SE location information of the first target NFC application; the SE location information of the first target NFC application indicates the first target SE that carries the first target NFC application; and the NFC management application is configured to manage one or more NFC applications. The NFC controller is configured to receive the first identifier of the first target NFC application and the SE location information of the first target NFC application that are transmitted when the NFC management application of the first target NFC application registers with a default payment application of an electronic device, where during installation, the NFC management application of the first target NFC application registers with the default payment application of the electronic device. The NFC controller is further configured to store the first identifier of the first target NFC application and the SE location information of the first target NFC application, where the SE location information of the first target NFC application indicates the first target SE that carries the first target NFC application.

With reference to the fifth aspect, in another possible design manner, that the NFC controller sends the transaction instruction to the first target SE includes: The NFC controller is specifically configured to: if the first target SE is an SE to which a route of the NFC controller points, directly send, by the NFC controller, the transaction instruction to the first target SE; or if the first target SE is not an SE to which a route of the NFC controller points, modify, by the NFC controller, the route to point to the first target SE, and then send the transaction instruction to the first target SE.

With reference to the fifth aspect, in another possible design manner, the NFC controller stores a routing table, where the routing table includes the first identifiers and the SE location information of the plurality of NFC applications. The routing table further includes a non-standard card default item, and the non-standard card default item is used to point to, when the transaction instruction does not carry the first identifier, an SE corresponding to current scenario information of the electronic device. The NFC controller is further configured to: when the transaction instruction does not carry the first identifier, receive indication information used to indicate a second target SE; and configure the non-standard card default item to point to the second target SE. The NFC controller is further configured to send the transaction instruction to the second target SE to which the non-standard card default item points.

With reference to the fifth aspect, in another possible design manner, that the NFC controller is further configured to send the transaction instruction to the second target SE to which the non-standard card default item points includes: The NFC controller is specifically configured to: if the second target SE is an SE to which the non-standard card default item points, directly send, by the NFC controller, the transaction instruction to the second target SE to which the non-standard card default item points; or if the second target SE is not an SE to which the non-standard card default item points, configure, by the NFC controller, the non-standard card default item in the routing table to point to the second target SE, and then send the transaction instruction to the second target SE to which the non-standard card default item points.

According to a sixth aspect, an embodiment of this application provides a computer storage medium. The computer storage medium may include computer instructions, and when the computer instructions are run on an electronic device, the electronic device is enabled to perform the method according to any one of the third aspect and the fourth aspect or the possible design manners of the third aspect and the fourth aspect.

According to a seventh aspect, an embodiment of this application provides a computer program product. When the computer program product runs on a computer, the computer is enabled to perform the method according to any one of the third aspect and the fourth aspect or the possible design manners of the third aspect and the fourth aspect.

It may be understood that the method according to any one of the third aspect and the fourth aspect or the possible design manners of the third aspect and the fourth aspect, the NFC chip according to the fifth aspect, the computer storage medium according to the sixth aspect, and the computer program product according to the seventh aspect that are provided above may all be implemented in the electronic device according to any one of the first aspect and the second aspect or the possible design manners of the first aspect and the second aspect. Therefore, for beneficial effects that can be achieved by the method, the NFC chip, the computer storage medium, and the computer program product, refer to the beneficial effects achieved by the corresponding electronic device provided above. Details are not described herein again.

DESCRIPTION OF EMBODIMENTS

The following terms "first" and "second" are merely intended for a purpose of descriptions, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

Figure 1A:
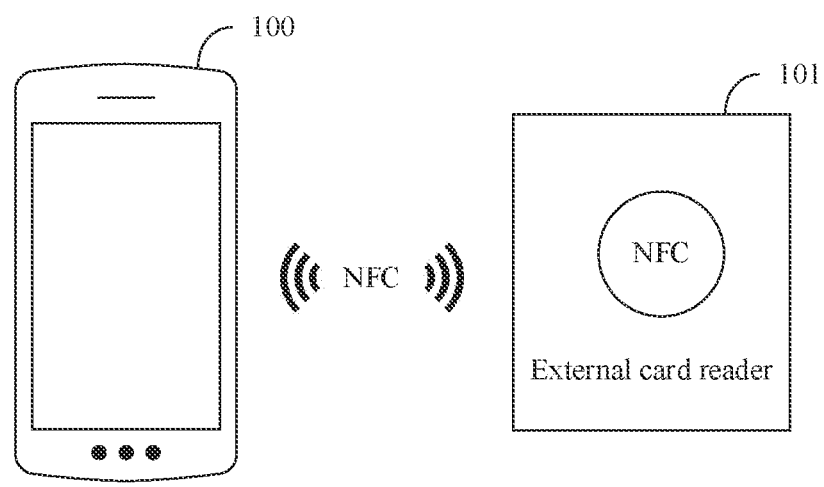
FIG. 1A is a schematic diagram of an NFC communications system according to an embodiment of this application.

FIG. 1A is a schematic diagram of an NFC communications system according to an embodiment of this application. As shown in FIG. 1A, the NFC communications system may include an electronic device 100 and an external card reader 101.

The electronic device 100 and the external card reader 101 each include an NFC chip, and may communicate with each other through NFC. For example, the external card reader 101 may be a bank POS terminal, a bus POS terminal, a door card reader, or the like shown in FIG. 2. Alternatively, the external card reader 101 may be a social security card reader or the like. A specific form of the external card reader 101 is not limited in this embodiment of this application.

For ease of understanding, some concepts related to the embodiments of this application are provided as examples for reference. Details are as follows:

NFC application: The NFC application is an application configured to implement near field communication, and has an emulation function of emulating a non-contact IC card. Based on different application scenarios, there may be different types of NFC applications, for example, a bus application, an access control application, and a bank card application.

The NFC application has an AID, but not all NFC applications support use of the AID. An NFC application that uses the AID supports AID identification, that is, the electronic device 100 can identify, based on an AID carried in a transaction instruction, an NFC application to be accessed by the transaction instruction.

To implement card emulation, the electronic device 100 needs to include three functional entities: a device host (device host, DH), an NFC controller (NFC controller, NFCC), and an SE.

DH: The DH may be responsible for NFCC management, for example, initialization, configuration, and power management.

NFCC: The NFCC may be responsible for physical data transmission through an antenna. The DH may be included in a main chip of the electronic device 100, and the NFCC may be included in an NFC chip of the electronic device 100.

SE: The SE may be responsible for providing a secure execution environment (for example, authentication or authorization) and a sensitive data storage environment for the NFC application. The SE is a secure element chip. The SE may simultaneously carry a plurality of NFC applications.

The electronic device 100 may include one or more SEs. If the electronic device 100 includes a plurality of SEs, these SEs may exist in different forms.

Figure 1B:
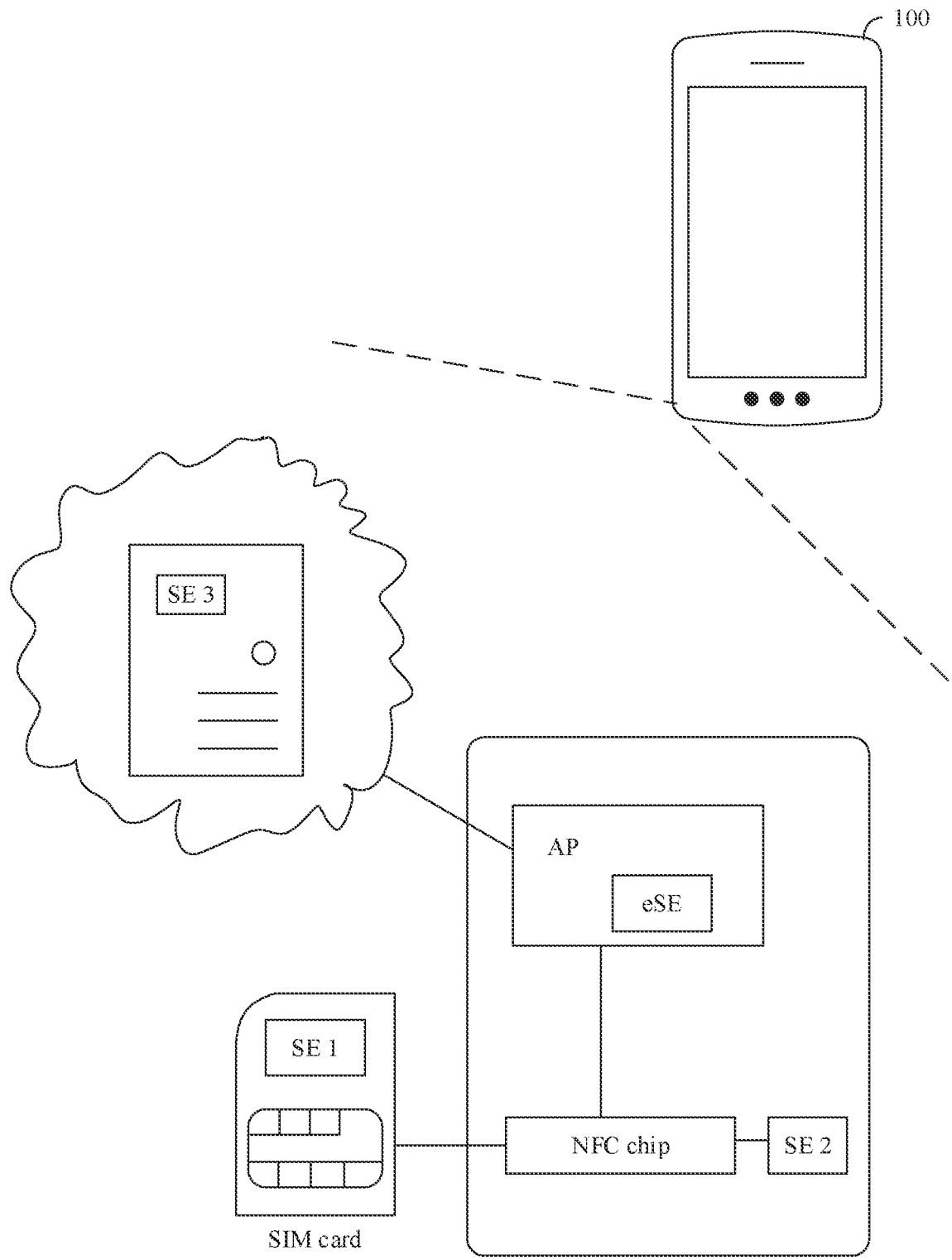
FIG. 1B is a schematic form diagram of three SEs of an electronic device according to an embodiment of this application.

For example, as shown in FIG. 1B, the electronic device 100 may include three SEs. The three SEs may be respectively an SE 1 in a form of a subscriber identity module (subscriber identification module, SIM) card, an SE 2 packaged together with an NFC chip, and an eSE in a form of a main chip (an application processor (application processor, AP) shown in FIG. 1B) of the electronic device 100. Hardware (an SE 3 shown in FIG. 1B) of the eSE is deployed in a server located in a cloud. The SE 3 is referred to as host-based card emulation (host card emulation, HCE).

Certainly, the SE is merely used as an example. In this embodiment, the SE may alternatively exist in another form in the electronic device 100. For example, the SE exists in a form of an SD card. For another example, the SE exists in a form of a universal integrated circuit card (Universal Integrated Circuit Card, UICC). This is not limited in this embodiment.

Figure 2:
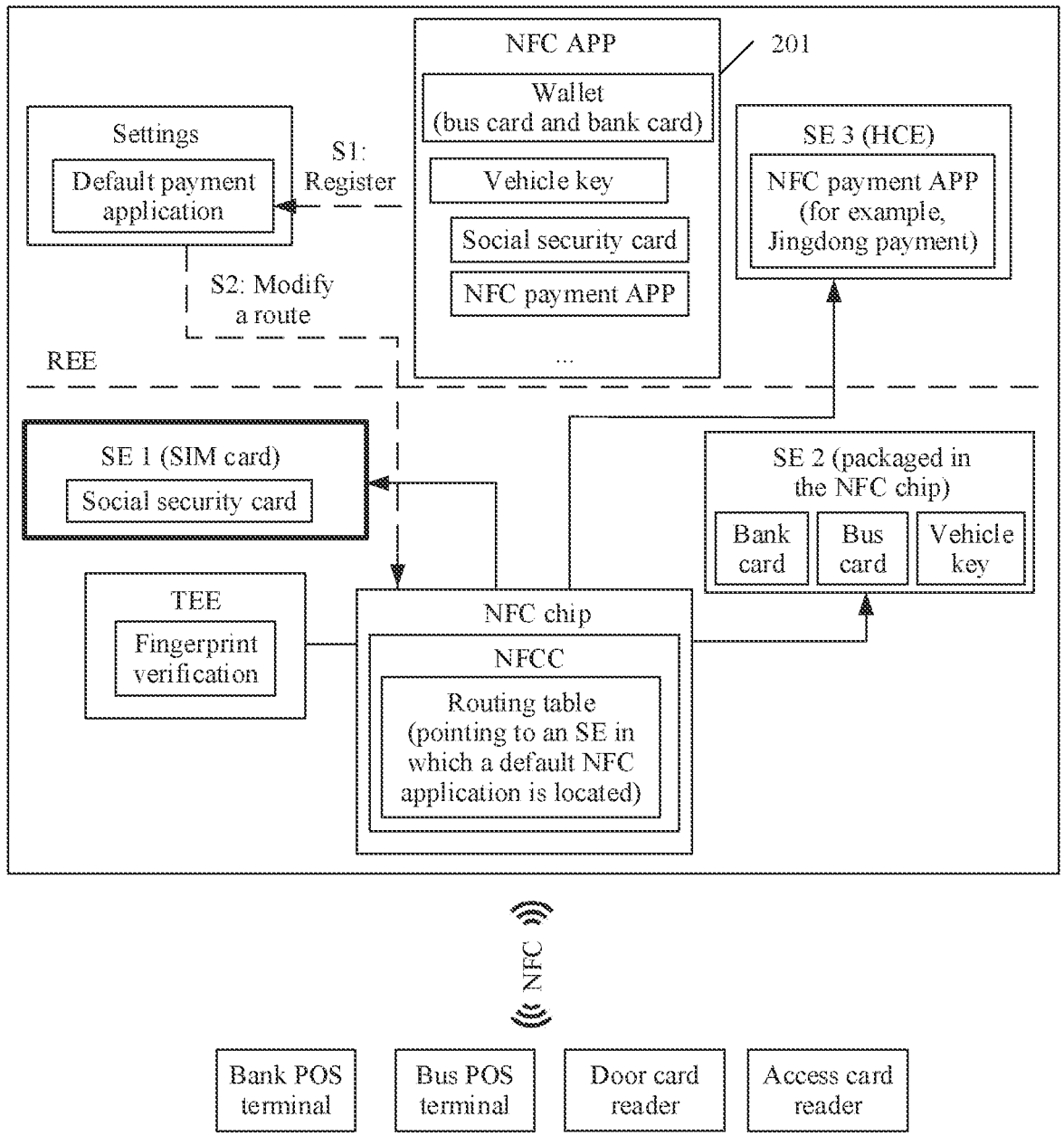
FIG. 2 is a schematic block diagram of registration and use procedures of an NFC application according to an embodiment of this application.

After an NFC application is downloaded to a corresponding SE, the NFC application may register with a "default payment application" (that is, perform S1 shown in FIG. 2). In this way, only when using an NFC application, a user can set a default NFC application in a selection interface of the default payment application of the electronic device.

Specifically, the user may control, by performing the following operations, the electronic device 100 to display the selection interface of the default payment application: The user taps an application icon of a "setting" application, and the electronic device 100 displays the setting interface; the user taps an "NFC" option in the setting interface, and the electronic device 100 displays an NFC setting interface; and the user taps a "default payment application" option in the NFC setting interface, and the electronic device 100 displays the selection interface of the default payment application. The selection interface of the default payment application includes one or more options of one or more NFC management applications (configured to manage one or more NFC applications) and one or more options of the one or more NFC applications.

For example, the selection interface of the default payment application may include an option of a "wallet" (for example, HiWallet) application (that is, an NFC management application) in an NFC APP 201 in FIG. 2, and options of a "vehicle key" application, a "social security card" application, and an "NFC payment APP" application (that is, NFC applications) in the NFC APP 201 in FIG. 2. The "wallet" application is an NFC management application configured to manage NFC applications, that is, a "bank card" application and a "bus card" application. For example, the "NFC payment APP" application may be a "Jingdong payment" application shown in FIG. 2.

If the user taps an option of an NFC application (an independent NFC application, for example, a "social security card" application) in the selection interface of the default payment application, it indicates that the user selects the NFC application (for example, the "social security card" application) as a default NFC application. It should be noted that an NFC management application of the "independent NFC application" in this embodiment of this application includes only one NFC application. To be specific, the NFC management application manages only one NFC application. For example, it is assumed that the "social security card" application shown in FIG. 2 is an independent NFC application. If the user taps an option of the "social security card" application in the selection interface of the default payment application, it indicates that the user selects the "social security card" application as a default NFC application. As shown in FIG. 2, the "social security card" application is carried in an SE 1.

If the user taps an option of an NFC management application (the NFC management application manages a plurality of NFC applications, for example, a "wallet" application manages a "bank card" application and a "bus card" application) in the selection interface of the default payment application, the user may continue to select, as a default payment application, an NFC application (for example, the "bank card" application) from the NFC applications (for example, the "bank card" application and the "bus card" application) managed by the NFC management application (for example, the "wallet" application).

After the user selects the default NFC application, the NFCC may modify a routing table in the NFCC (that is, perform S2 in FIG. 2), so that the routing table points to an SE in which the default NFC application is located. In this way, after the NFCC receives any transaction instruction, the routing table in the NFCC points to the SE. In other words, a route of the NFC controller points to the SE.

For example, assuming that the default NFC application selected by the user is the "social security card" application shown in FIG. 2, and the "social security card" application shown in FIG. 2 is carried in the SE 1, the NFCC may modify the routing table in the NFCC (that is, perform S2 in FIG. 2), so that the routing table points to the SE 1. In this way, after the NFCC receives any transaction instruction, the routing table in the NFCC points to the SE 1. In other words, the route of the NFC controller points to the SE 1.

For another example, assuming that the default NFC application selected by the user is the "bank card" application shown in FIG. 2, and the "bank card" application shown in FIG. 2 is carried in an SE 2, the NFCC may modify the routing table in the NFCC (that is, perform S2 in FIG. 2), so that the routing table points to the SE 2. In this way, after the NFCC receives any transaction instruction, the routing table in the NFCC points to the SE 2. In other words, the route of the NFC controller points to the SE 2.

Usually, only an SE to which the route of the NFCC points can undertake an NFC transaction, that is, process the transaction instruction. When the transaction instruction needs to access an NFC application carried in another SE, the transaction cannot be performed. The another SE is not the SE to which the route of the NFC controller points. Specifically, because the route of the NFC controller cannot point to an SE in which an NFC application to be accessed by the transaction instruction is located, the NFC controller cannot send the transaction instruction to the SE, and the NFC application in the SE cannot execute the transaction instruction. Consequently, the transaction cannot be completed.

For example, with reference to FIG. 1A and FIG. 1B and FIG. 2, the route of the NFCC points to an SE 1 in a form of a SIM card. When the electronic device 100 is close to a card reader (or a POS terminal), the electronic device may receive a transaction instruction sent by the card reader (or the POS terminal). If an NFC application (for example, the "social security card" application shown in FIG. 2) to be accessed by the transaction instruction is carried in the SE 1, the NFC controller may send the transaction instruction to the SE 1, and the corresponding NFC application (for example, the "social security card" application shown in FIG. 2) in the SE 1 executes the transaction instruction, to complete the transaction. If an NFC application (for example, the "vehicle key" application shown in FIG. 2) to be accessed by the transaction instruction is not carried in the SE 1, but is carried in an SE 2 or an SE 3 (for example, the "vehicle key" application shown in FIG. 2 is carried in the SE 2), because the route of the NFC controller cannot point to the SE 2 or the SE 3, the NFC controller cannot send the transaction instruction to the SE 2 or the SE 3, and the NFC application in the SE 2 or the SE 3 cannot execute the transaction instruction. Consequently, the transaction cannot be completed.

This embodiment provides an automatic routing method for an SE. The method may be applied to an electronic device that includes a plurality of SEs, and the electronic device has an NFC function. According to the method provided in this embodiment, even if the electronic device includes the plurality of SEs, the electronic device can be automatically routed to an SE in which an NFC application to be accessed by a transaction instruction is located.

Figure 3:
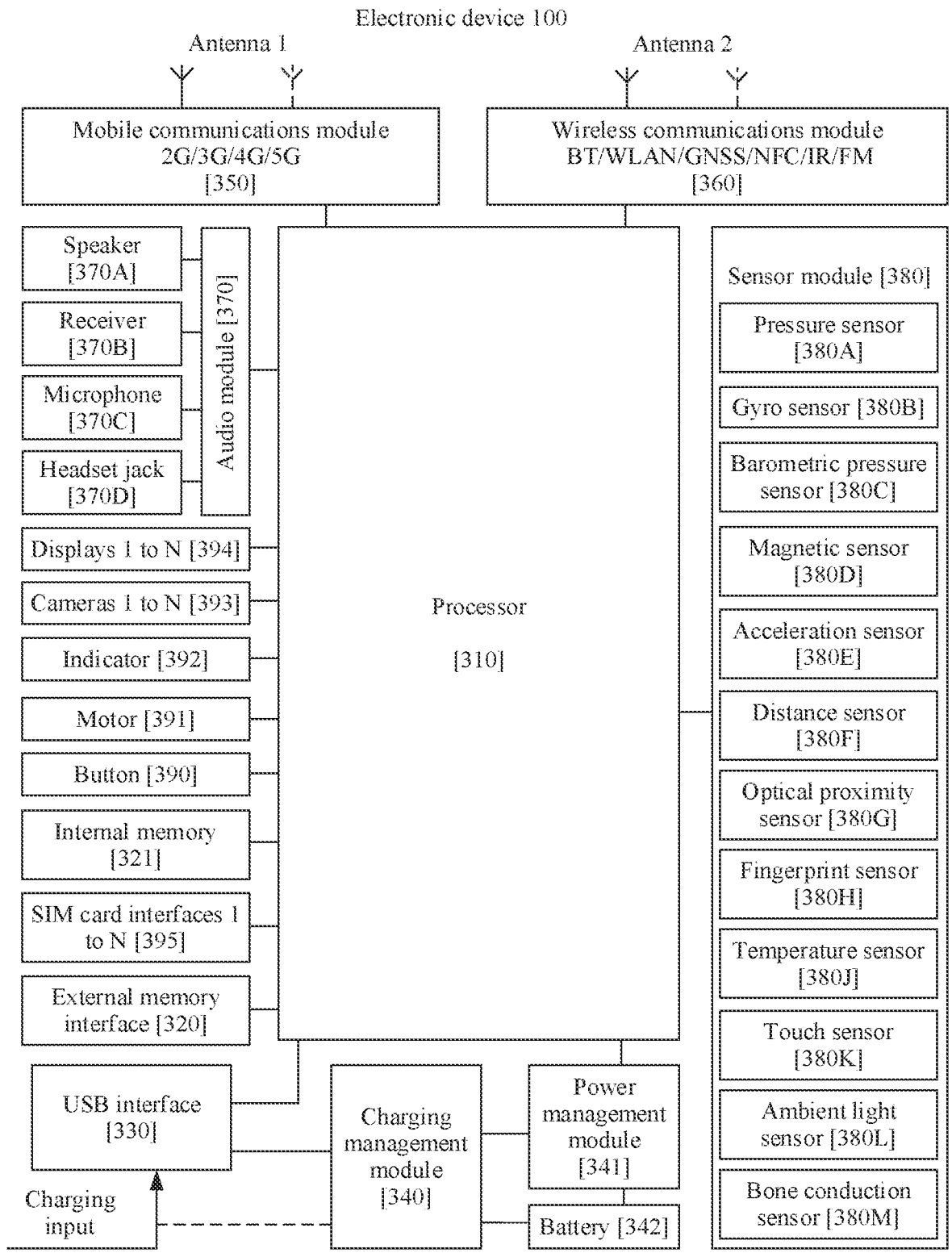
FIG. 3 is a schematic diagram of a hardware structure of an electronic device according to an embodiment of this application.

FIG. 3 is a schematic structural diagram of an electronic device 100 according to an embodiment. As shown in FIG. 3, the electronic device 100 may include a processor 310, an external memory interface 320, an internal memory 321, a universal serial bus (universal serial bus, USB) interface 330, a charging management module 340, a power management module 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 391, an indicator 392, a camera 393, a display 394, a SIM card interface 395, and the like.

The sensor module 380 may include a pressure sensor 380A, a gyro sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that a structure shown in this embodiment does not constitute a specific limitation on the electronic device 100. In some other embodiments, the electronic device 200 may include more or fewer components than those shown in the figure, combine some components, split some components, or have different component arrangements. The components shown in the figure may be implemented by using hardware, software, or a combination of software and hardware.

The processor 310 may include one or more processing units. For example, the processor 310 may include an AP, a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

In some embodiments, the electronic device 100 may include an SE in a form of an AR and the SE may be referred to as an eSE. Hardware (the SE 3 shown in FIG. 1B) of the eSE is deployed in a server located in a cloud.

The controller may be a nerve center and a command center of the electronic device 100. The controller may generate an operation control signal based on an instruction operation code and a time sequence signal, to complete control of instruction fetching and instruction execution.

A memory may be further disposed in the processor 310, and is configured to store instructions and data. In some embodiments, the memory in the processor 310 is a cache. The memory may store instructions or data that is just used or cyclically used by the processor 310. If the processor 310 needs to use the instructions or the data again, the processor 310 may directly invoke the instructions or the data from the memory. This avoids repeated access and reduces a waiting time of the processor 310. Therefore, system efficiency is improved.

The charging management module 340 is configured to receive a charging input from the charger. The charger may be a wireless charger or a wired charger. The power management module 341 is configured to connect the battery 342 and the charging management module 340 to the processor 310. The power management module 341 receives an input of the battery 342 and/or the charging management module 340, and supplies power to the processor 310, the internal memory 321, an external memory, the display 394, the camera 393, the wireless communications module 360, and the like.

A wireless communication function of the electronic device 100 may be implemented by using the antenna 1, the antenna 2, the mobile communications module 350, the wireless communications module 360, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 350 may provide a wireless communication solution that includes 2G/3G/4G/5G or the like and that is applied to the electronic device 100. The mobile communications module 350 may include at least one filter, a switch, a power amplifier, a low noise amplifier (low noise amplifier, LNA), and the like. The mobile communications module 350 may receive an electromagnetic wave by using the antenna 1, perform processing such as filtering or amplification on the received electromagnetic wave, and transmit the electromagnetic wave to the modem processor for demodulation. The mobile communications module 350 may further amplify a signal modulated by the modem processor, and convert the signal into an electromagnetic wave for radiation by using the antenna 1. The wireless communications module 360 may provide a wireless communication solution that includes NFC, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), an infrared (infrared, IR) technology, or the like and that is applied to the electronic device 100. The wireless communications module 360 may be one or more components integrating at least one communications processor module. The wireless communications module 360 receives an electromagnetic wave by using the antenna 2, performs frequency modulation and filtering processing on the electromagnetic wave signal, and sends a processed signal to the processor 310. The wireless communications module 360 may further receive a to-be-sent signal from the processor 310, perform frequency modulation and amplification on the signal, and convert the signal into an electromagnetic wave for radiation by using the antenna 2.

In some embodiments, the wireless communications module 360 may include an NFC chip, and the NFC chip may include an NFCC. The NFC chip can perform processing such as amplification, analog-to-digital conversion, digital-to-analog conversion, and storage on a signal. A DH is included in a main chip of the electronic device 100. The DH may be integrated into the processor of the electronic device 100.

In some embodiments, the electronic device 100 may include an SE 2 packaged together with an NFC chip. The SE 2 is packaged in the NFC chip of the electronic device 100.

In some embodiments, the antenna 1 and the mobile communications module 350 in the electronic device 100 are coupled, and the antenna 2 and the wireless communications module 360 in the electronic device 100 are coupled, so that the electronic device 100 can communicate with a network and another device by using a wireless communications technology.

The electronic device 100 implements a display function through the GPU, the display 394, the application processor, and the like. The GPU is a microprocessor for image processing, and connects the display 394 to the application processor. The GPU is configured to: perform mathematical and geometric calculation, and render an image. The processor 310 may include one or more GPUs that execute program instructions to generate or change display information. The display 394 is configured to display a text, an image, a video, or the like.

The electronic device 100 may implement a photographing function through the ISP, the camera 393, the video codec, the GPU, the display 394, the application processor, and the like.

The ISP is configured to process data fed back by the camera 393. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 393.

The camera 393 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 393, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more video codecs. In this way, the electronic device 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 320 may be configured to connect to an external storage card such as a micro SD card, to extend a storage capability of the electronic device 100. The external storage card communicates with the processor 310 through the external memory interface 320, to implement a data storage function. For example, files such as music and a video are stored in the external storage card. In some embodiments, the electronic device 100 may include an SE in a form of an external storage card.

The internal memory 321 may be configured to store computer executable program code. The executable program code includes instructions. The processor 310 performs various function applications of the electronic device 100 and data processing by running the instructions stored in the internal memory 321. The internal memory 321 may include a program storage area and a data storage area.

The electronic device 100 may implement audio functions, for example, music playing and recording, by using the audio module 370, the speaker 370A, the receiver 370B, the microphone 370C, the headset jack 370D, the application processor, and the like.

The audio module 370 is configured to convert digital audio information into an analog audio signal output, and is also configured to convert an analog audio input into a digital audio signal. The audio module 370 may be further configured to: code and decode an audio signal. In some embodiments, the audio module 370 may be disposed in the processor 310, or some functional modules in the audio module 370 are disposed in the processor 310.

The speaker 370A, also referred to as a "horn", is configured to convert an audio electrical signal into a sound signal. The electronic device 100 may be configured to: listen to music or answer a hands-free call by using the speaker 370A. The receiver 370B, also referred to as an "earpiece", is configured to convert an audio electrical signal into a sound signal. When a call is answered or speech information is received by using the electronic device 100, the receiver 370B may be put close to a human ear to receive a speech.

The microphone 370C, also referred to as a "mike" or a "microphone", is configured to convert a sound signal into an electrical signal. At least one microphone 370C may be disposed in the electronic device 100. In some other embodiments, two microphones 370C may be disposed in the electronic device 100, to collect a sound signal and further implement a noise reduction function. In some other embodiments, three, four, or more microphones 370C may alternatively be disposed in the electronic device 100, to collect a sound signal, reduce noise, identify a sound source, implement a directional recording function, and the like.

The headset jack 370D is configured to connect to a wired headset. The headset jack 370D may be the USB interface 330, or may be a 3.5 mm open mobile terminal platform (open mobile terminal platform, OMTP) standard interface or a cellular telecommunications industry association of the USA (cellular telecommunications industry association of the USA, CTIA) standard interface.

The button 390 may include a power button, a volume button, and the like. The button 390 may be a mechanical button, or may be a touch button. The electronic device 100 may receive a key input, and generate a key signal input related to a user setting and function control of the electronic device 100. The motor 391 may generate a vibration prompt. Different application scenarios (for example, a time reminder, information receiving, an alarm clock, and a game) may also correspond to different vibration feedback effects. The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into the SIM card interface 395 or removed from the SIM card interface 395, to implement contact with or separation from the electronic device 100. The electronic device 100 may support one or N SIM card interfaces, where N is a positive integer greater than 1. The SIM card interface 395 may support a nano SIM card, a micro SIM card, a SIM card, and the like. In some embodiments, the electronic device 100 may include an SE 1 in a form of a SIM card. The SE 1 is packaged in the SIM card of the electronic device 100.

All technical solutions in the following embodiments may be implemented in the electronic device 100 that has the foregoing hardware architecture. The following describes in detail an automatic routing method for an SE provided in the embodiments. For ease of understanding, descriptions are provided in the following embodiments by using an example in which an electronic device includes three SEs (as shown in FIG. 1B).

In this embodiment of this application, an identifier of an NFC application may be a first identifier or a second identifier. The first identifier is an identifier of a standard NFC application, and the second identifier is an identifier of a non-standard NFC application. For example, the first identifier may be an AID, and the standard NFC application is an NFC application that supports the AID. The second identifier is not an AID, and the non-standard NFC application does not support the AID.

An embodiment of this application provides an automatic routing method for an SE. An electronic device 100 may download a plurality of NFC applications from a server. The plurality of NFC applications may be carried in one or more SEs of the electronic device 100. Each SE may carry at least one NFC application.

A user may set a default NFC application in the electronic device 100. For example, the user sets an NFC application 1 as the default NFC application of the electronic device 100. Assuming that the NFC application 1 is carried in an SE 1, a route of an NFCC of the electronic device 100 points to the SE 1. However, when the electronic device 100 is close to a card reader or a POS terminal, an NFC application to be accessed by a transaction instruction received by the electronic device 100 may not be the NFC application in the SE 1. For example, the NFC application to be accessed by the transaction instruction may be an NFC application 2, and the NFC application 2 is carried in an SE 2. Because the route of the NFCC of the electronic device 100 does not point to the SE 1, the transaction cannot be performed.

In this embodiment of this application, regardless of whether the route of the NFCC points to an SE in which the NFC application to be accessed by the transaction instruction is located, the electronic device 100 (the NFCC of the electronic device 100) can be automatically routed to the SE in which the NFC application to be accessed by the transaction instruction is located, and interact with the card reader or the POS terminal to complete the transaction.

The NFCC of the electronic device 100 may store first identifiers and SE location information of a plurality of NFC applications, and the SE location information indicates an SE that carries a corresponding NFC application. For example, the NFCC of the electronic device 100 may maintain a routing table. The NFCC of the electronic device 100 may configure one or more pieces of routing information of one or more NFC applications in the routing table, where the routing information of the NFC application may include a first identifier and SE location information of the NFC application. The SE location information indicates an SE that carries the NFC application, namely, an SE that is of the electronic device 100 and in which the NFC application is carried. For example, the first identifier may be an AID of the NFC application. Certainly, the first identifier includes but is not limited to the AID.

Figure 5A:
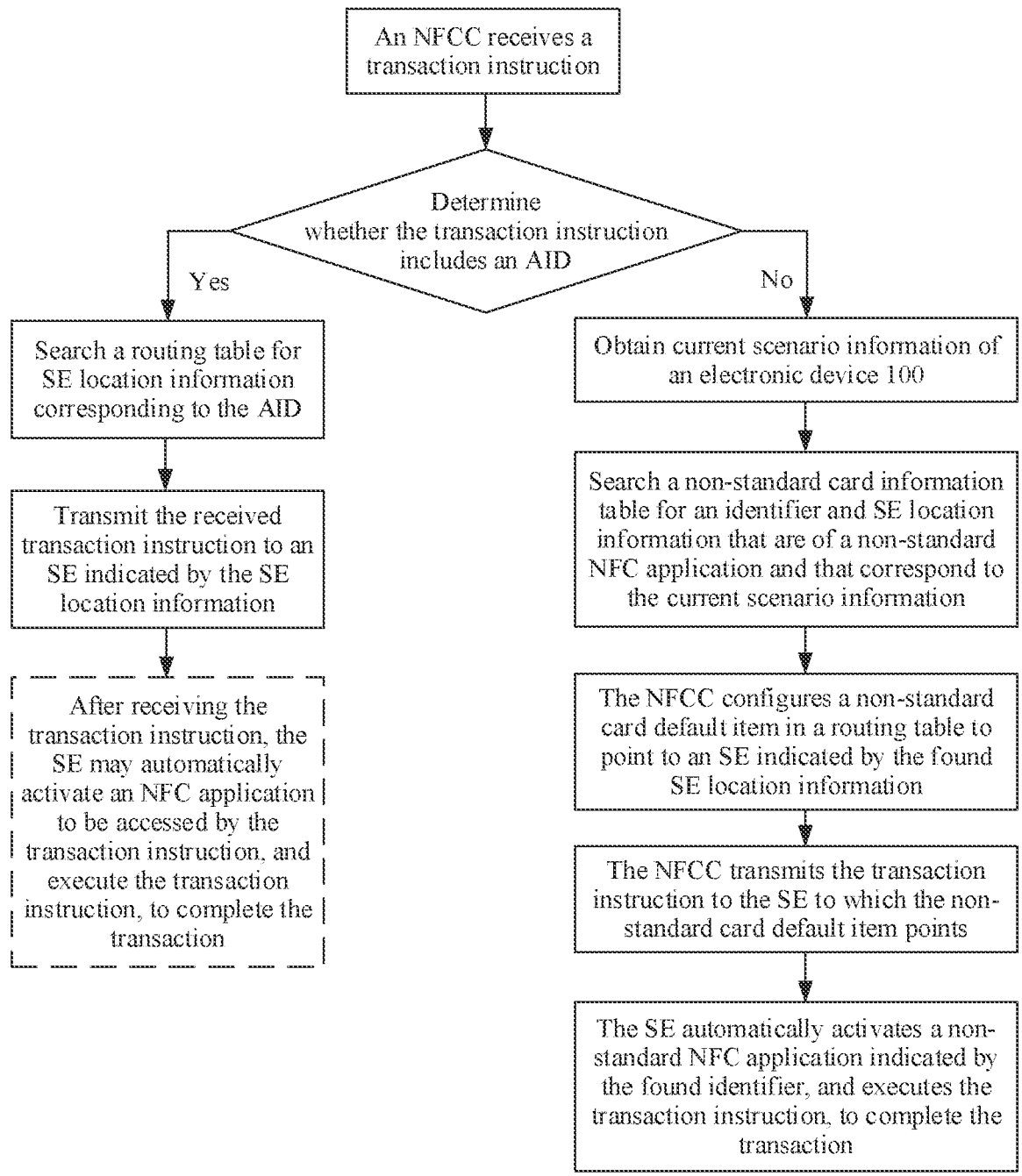
FIG. 5A is a flowchart of an automatic routing method for an SE according to an embodiment of this application.

Then, when the electronic device 100 is close to a card reader or a POS terminal, the NFCC of the electronic device 100 may receive a transaction instruction from the card reader or the POS terminal. The transaction instruction may or may not include a first identifier (for example, an AID). Therefore, as shown in FIG. 5A, after receiving the transaction instruction, the NFCC of the electronic device 100 may determine whether the transaction instruction includes the AID. If the transaction instruction includes the AID, the NFCC may search the routing table for SE location information corresponding to the AID, and then transmit the received transaction instruction to an SE (that is, a first target SE) indicated by the SE location information. To be specific, the NFCC can be automatically routed, based on the first identifier carried in the transaction instruction, to an SE in which an NFC application to be accessed by the transaction instruction is located.

Further, after receiving the transaction instruction, the SE (that is, the first target SE) indicated by the SE location information may determine a first target NFC application (that is, the NFC application to be accessed by the transaction instruction) from NFC applications carried in the first target SE, and run the first target NFC application, to execute the transaction instruction.

Specifically, the first target SE may send the transaction instruction to the NFC application (that is, the first target NFC application) to be accessed by the transaction instruction, and the first target NFC application executes the transaction instruction, to complete the transaction.

In this embodiment of this application, that the electronic device 100 is close to a card reader or a POS terminal may be specifically: A distance between the electronic device 100 and the card reader or the POS terminal is less than a preset distance threshold. There is the card reader or the POS in this embodiment of this application.

Figure 4:
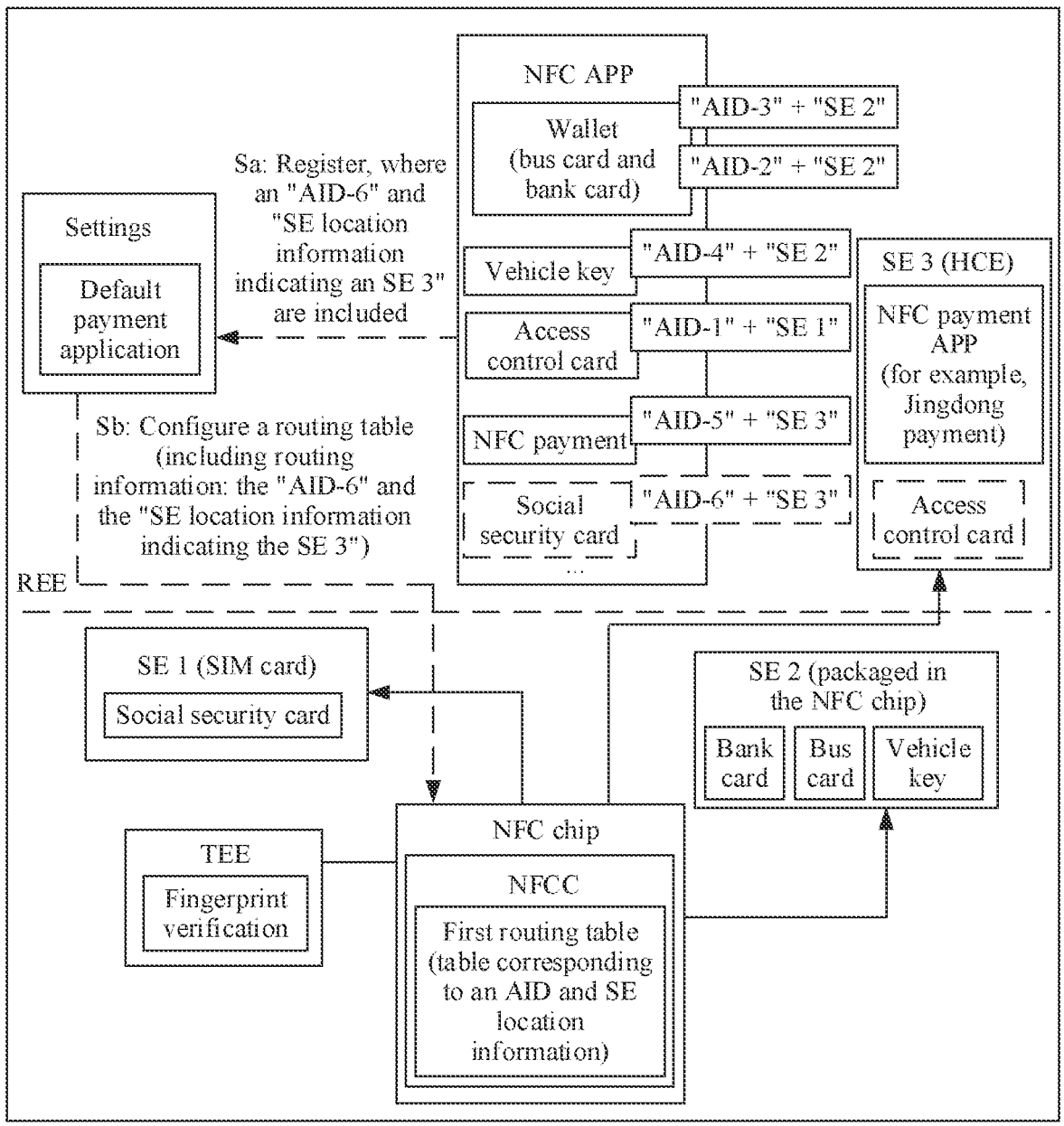
FIG. 4 is another schematic block diagram of registration and use procedures of an NFC application according to an embodiment of this application.

For example, Table 1 shows AID identifiers of a plurality of NFC applications shown in FIG. 2 or FIG. 4.

TABLE 1

| AID of an NFC application | |
|---|---|
| NFC application | AID |
| Social security card | AID-1 |
| Bank card | AID-2 |
| Bus card | AID-3 |
| Vehicle key | AID-4 |
| NFC payment APP | AID-5 |
| . . . | . . . |

As shown in Table 1, an AID of the "social security card" application is the AID-1; an AID of the "bank card" application is the AID-2; an AID of the "bus card" application is the AID-3: an AID of the "vehicle key" application is the AID-4; and an AID of the "NFC payment" application is the AID-5. For example, the "NFC payment APP" application may be a "Meituan payment" application or the "Jingdong payment" application shown in FIG. 2.

For example, Table 2 shows an instance of a routing table according to an embodiment of this application.

TABLE 2

| Routing table | |
|---|---|
| AID | SE location information |
| AID-1 | SE location information 1 (indicating an SE 1) |
| AID-2 | SE location information 2 (indicating an SE 2) |
| AID-3 | SE location information 2 (indicating the SE 2) |
| AID-4 | SE location information 2 (indicating the SE 2) |
| AID-5 | SE location information 3 (indicating an SE 3) |
| . . . | . . . |

The SE location information may be an identifier of an SE that carries the NFC application. As shown in Table 2, the SE location information 1 may be an identifier of the SE 1, the SE location information 2 may be an identifier of the SE 2, and the SE location information 3 may be an identifier of the SE 3.

In addition, it can be learned from Table 2 that the AID-1 corresponds to the SE location information 1, and the "social security card" application identified by the AID-1 shown in Table 1 is carried in the SE 1 (that is, an SE 1 in a form of a SIM card shown in FIG. 4); the "bank card" application identified by the AID-2, the "bus card" application identified by the AID-3, and the "vehicle key" application identified by the AID-4 shown in Table 1 are carried in the SE 2 (that is, an SE 2 packaged together with an NFC chip shown in FIG. 4); and the "NFC payment APP" application identified by the AID-5 shown in Table 1 is carried in the SE 3 (that is, an SE 3 in a form of HCE shown in FIG. 4).

It may be understood that the SE indicated by the SE location information may or may not be the SE to which the route of the NFCC points. After finding the SE location information corresponding to the AID, the electronic device 100 may determine that the SE indicated by the SE location information is the SE to which the route of the NFCC points. If the SE is the SE to which the route of the NFCC points, the NFCC may directly transmit a received transaction instruction to the SE, and an NFC application that is to be accessed by the transaction instruction and that is in the SE executes the transaction instruction, to complete the transaction. If the SE is not the SE to which the route of the NFCC points, the NFCC may modify the route to point to the SE, and then transmit a received transaction instruction to the SE, and an NFC application that is to be accessed by the transaction instruction and that is in the SE executes the transaction instruction, to complete the transaction.

For example, assuming that a default NFC application is a "social security card" application shown in FIG. 4, and the "social security card" application is carried in the SE 1 shown in FIG. 4, the route of the NFCC points to the SE 1.

If the NFCC of the electronic device 100 receives a transaction instruction 1 that carries the AID-1, the NFCC may search the routing table shown in Table 2 for the SE location information 1 corresponding to the AID-1. The SE location information 1 indicates that an NFC application to be accessed by the transaction instruction 1 is carried in the SE 1. The electronic device 100 may directly transmit the transaction instruction 1 to the SE 1, and the NFC application (the "social security card" application corresponding to the AID-1 shown in Table 1) that is to be accessed by the transaction instruction 1 and that is in the SE 1 executes the transaction instruction 1, to complete the transaction.

If the NFCC of the electronic device 100 receives a transaction instruction 2 that carries the AID-3, the NFCC may search the routing table shown in Table 2 for the SE location information 2 corresponding to the AID-3. The SE location information 2 indicates that an NFC application to be accessed by the transaction instruction 2 is carried in the SE 2. The electronic device 100 may modify the route to point to the SE 2, and then transmit the transaction instruction 2 to the SE 2, and the NFC application (the "bus card" application corresponding to the AID-3 shown in Table 1) that is to be accessed by the transaction instruction 2 and that is in the SE 2 executes the transaction instruction 2, to complete the transaction.

In this embodiment of this application, one NFC management application may manage one or more NFC applications. The NFC management application carries a first identifier and SE location information of the NFC application managed by the NFC management application. When an NFC management application of the NFC application (for example, a first target NFC application) is installed on the electronic device 100, the NFC management application may register with a default payment application of the electronic device 100. In this way, the default payment application may transmit the first identifier and the SE location information of the NFC application to the NFCC of the electronic device 100, and the NFCC of the electronic device 100 may store the first identifier and the SE location information of the NFC application.

For example, the NFCC of the electronic device 100 may maintain a routing table, where the routing table includes correspondences between AIDs and SE location information of a plurality of NFC applications. In this way, even if the electronic device 100 includes a plurality of SEs, the electronic device 100 may find, from the routing table based on an AID carried in a transaction instruction. SE location information of an NFC application to be accessed by the transaction instruction, and determine an SE that carries the NFC application to be accessed by the transaction instruction. To be specific, the NFCC can be automatically routed, based on the first identifier carried in the transaction instruction, to an SE in which the NFC application to be accessed by the transaction instruction is located.

In this embodiment of this application, the transaction instruction may be an instruction sent by any type of card reader (for example, a handheld mobile card reader or a fixed card reader) or any type of POS terminal (for example, a handheld mobile POS terminal or a fixed POS terminal). The transaction instructions may be instructions of various types or in various frame formats. For example, the transaction instructions may be instructions in frame formats such as an application protocol data unit (Application Protocol Data Unit, APDU) frame format, a single-byte short frame format, and a long frame format. For another example, the transaction instructions may be instructions of types such as a 14443 TYPE (TYPE) A, a 14443 TYPE B, international standardization organization (International Standardization Organization, ISO) 18092, and ISO15693.

A method for configuring the routing table by the NFCC is described herein in this embodiment of this application.

In some embodiments, when an NFC management application of an NFC application is installed, routing information that corresponds to the NFC application and that is in the routing table shown in Table 2 may be configured according to a route configuration command delivered by a DH of the electronic device 100. The routing information of the NFC application may include an AID and SE location information of the NFC application. The SE location information is used to indicate an SE in which the NFC application is carried. The foregoing default payment application is managed by the DH.

Specifically, an NFC application (for example, a "social security card" application) is downloaded to an SE (for example, an SE 1 in a form of a SIM card) of the electronic device 100. After determining that the NFC application is successfully downloaded to the SE (for example, the SE 1) of the electronic device 100, the SE may send, to the DH of the electronic device 100, a message used to indicate that the NFC application is successfully downloaded. After receiving the message, the DH of the electronic device 100 may send a route configuration command to the NFCC of the electronic device 100. The route configuration command may be locally predefined in the electronic device 100, or may be delivered to the DH of the electronic device 100 by a server that provides a download resource for the NFC application. The route configuration command is used to indicate the NFCC to configure the routing information of the NFC application in the routing table. The NFCC of the electronic device 100 may configure the routing information of the NFC application in the routing table according to the route configuration command. The routing information may include the AID and the SE location information of the NFC application.

For example, a process of performing route configuration in the routing table is described by using an example in which the NFCC configures routing information of an "access control card" application. Detailed descriptions of processes of configuring routing information of the "social security card" application, the "vehicle key" application, the "bus card" application, and the like are similar to the detailed descriptions of the process of configuring the routing information corresponding to the "access control card" application.

Based on an operation of a user, the electronic device 100 may download the "access control card" application to an SE of the electronic device 100. As shown in FIG. 4, the "access control card" application is downloaded to the SE 3. After the "access control card" application is successfully downloaded to the SE 3, the SE 3 may send, to the DH of the electronic device 100, a message indicating that the "access control card" application is successfully downloaded. In response to the message, the DH of the electronic device 100 may send a route configuration command to the NFCC of the electronic device 100. For example, the route configuration command includes the routing information such as an AID-6 and SE location information 3 of the "access control card" application. The NFCC of the electronic device 100 may perform route configuration according to the route configuration command delivered by the DH, that is, configure the routing information of the "access control card" application in the routing table shown in Table 2. For example, the configured routing information is routing information (an AID-6 and SE location information 3) in a routing table shown in Table 3. In this way, the routing information of the "access control card" application is configured, and subsequently, whether a transaction instruction needs to access the NFC application may be determined by using the routing information.

TABLE 3

Routing table

| AID | SE location information |
| --- | --- |
| AID-1 | SE location information 1 (indicating an SE 1) |
| AID-2 | SE location information 2 (indicating an SE 2) |
| AID-3 | SE location information 2 (indicating the SE 2) |
| AID-4 | SE location information 2 (indicating the SE 2) |
| AID-5 | SE location information 3 (indicating an SE 3) |
| AID-6 | SE location information 3 (indicating the SE 3) |
| ... | ... |

It may be understood that after the "access control card" application is successfully downloaded to the SE 3, the SE 3 may send, to the DH of the electronic device 100, a message indicating that the "access control card" application is successfully downloaded. In response to the message, the DH of the electronic device 100 may register the "access control card" application with a default payment application (that is, perform Sa shown in FIG. 4). Then, the DH of the electronic device 100 may send a route configuration command to the NFCC of the electronic device 100, to indicate the NFCC of the electronic device 100 to configure the routing information in the routing table (that is, perform Sb shown in FIG. 4).

Figure 5B:
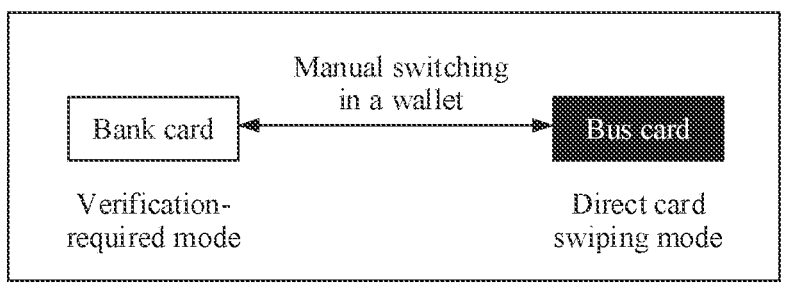
FIG. 5B is a schematic diagram of a switching instance of a default NFC application according to an embodiment of this application.

It may be understood that the NFC management application (for example, a "wallet" application) may manage one or more NFC applications. For example, a "wallet" application (namely, an NFC management application) shown in FIG. 2 or FIG. 4 manages two NFC applications, a "bank card" application and a "bus card" application. Different NFC applications support different NFC service verification manners. Specifically, as shown in FIG. 5B, a "bank card" application corresponds to a verification-required mode, and a transaction can be completed only after user verification (for example, password verification, fingerprint verification, face verification, iris authentication, voiceprint authentication, or behavior authentication) succeeds. A "bus card" application corresponds to a direct card swiping mode, and a transaction can be completed without user verification.

For example, for the "bus card" application, a process of interaction between the electronic device 100 and a card reader or a POS terminal (for example, a bus POS terminal) may include: (1) The bus POS terminal keeps sending an NFC field strength signal. (2) When the electronic device 100 is close to the bus POS terminal, the electronic device 100 may receive the field strength signal sent by the bus POS terminal. (3) The NFCC of the electronic device 100 may return a response to the bus POS terminal in response to the field strength signal without user verification. (4) After receiving the response, the bus POS terminal sends a transaction instruction to the electronic device 100. (5) The NFCC of the electronic device 100 receives the transaction instruction, and completes the transaction according to the transaction instruction.

For another example, in an example in which the "bank card" application is for payment at a supermarket cashier, a process of interaction between the electronic device 100 and a supermarket POS terminal may include: (1) The supermarket POS terminal keeps sending an NFC field strength signal. (2) When the electronic device 100 is close to the supermarket POS terminal, the electronic device 100 may receive the field strength signal sent by the supermarket POS terminal. (3) The electronic device 100 needs to invoke user verification (for example, password verification, fingerprint verification, face verification, iris authentication, voiceprint authentication, or behavior authentication), and sends a response to the supermarket POS terminal only after the user verification succeeds. (4) After receiving the response, the supermarket POS terminal sends a transaction instruction to the electronic device 100. (5) The NFCC of the electronic device 100 receives the transaction instruction, and completes the transaction according to the transaction instruction.

However, referring to FIG. 6(*a*), if a user sets the "bus card" application in the "wallet" application as a default NFC application, another NFC application (for example, a "bank card" application) in the "wallet" application is disabled. In this case, if the electronic device 100 is close to the supermarket POS terminal, a transaction between the electronic device 100 and the supermarket POS terminal may fail because user verification cannot be invoked. If the user expects to use the "bank card" application for payment, the user may set the "bank card" application in the "wallet" application as a default NFC application, and another NFC application (for example, a "bus card" application) in the "wallet" application is disabled. In this case, if the electronic device 100 is close to the bus POS terminal, a transaction between the electronic device 100 and the bus POS terminal fails. If the user expects to use the "bus card" application for payment again, the user may reset the "bus card" application in the "wallet" application as a default NFC application. In daily life of the user, the user may need to frequently set the default NFC application in the "wallet" application through manual switching. Consequently, user experience is relatively poor.

Based on this, a concept of "direct card swiping is normal, and verification is temporary" is proposed in this embodiment of this application. An NFC management application of the electronic device 100 may manage the following NFC applications: a first NFC application (for example, a "bus card" application, a "social security card" application, or a "vehicle key" application) and a second NFC application (for example, a "bank card" application). An NFC service verification manner supported by the first NFC application is a direct card swiping mode in which user verification does not need to be performed. An NFC service verification manner supported by the second NFC application is a verification-required mode in which the user verification needs to be performed. The user verification is at least any one of password verification, fingerprint verification, iris authentication, voiceprint authentication, behavior authentication, or face verification.

The automatic routing method for an SE and an automatic activation method for an NFC application provided in this embodiment of this application may include the following solutions: The first NFC application and the second NFC application of the electronic device 100 are carried in a first SE. The first NFC application may be a normal default NFC application, and the second NFC application may be a temporary default NFC application. Specifically, the default NFC application of the electronic device 100 may be the first NFC application (the first NFC application may be set as the default NFC application by the user). In this way, the user can complete, at any time by using the electronic device 100, a transaction with a card reader or a POS terminal corresponding to the first NFC application. When the user expects to use the second NFC application for payment, the user may input a preset shortcut operation to the electronic device 100. In response to the preset shortcut operation, the electronic device 100 may temporarily set the second NFC application as a default NFC application, so that the electronic device 100 can complete a transaction with a card reader or a POS terminal corresponding to the second NFC application.

In this embodiment of this application, even if one SE includes the first NFC application (for example, the "bus card" application, the "social security card" application, or the "vehicle key" application) in the direct card swiping mode and the second NFC application (for example, the "bank card" application) in the verification-required mode, the user does not need to frequently set the default NFC application. The electronic device 100 can complete, at any time, the transaction with the card reader or the POS terminal corresponding to the first NFC application, and can complete, in response to the preset shortcut operation, the transaction with the card reader or the POS terminal corresponding to the second NFC application.

For example, the preset shortcut operation may be at least any one of a double-tap operation performed by the user on a power button (or referred to as a lock screen button) of the electronic device 100, a preset tap operation performed by the user on the electronic device 100 (for example, N consecutive tap operations performed on a rear housing of the electronic device 100, where N≥2, and N is a positive integer), a preset operation (for example, a touch and hold operation) performed by the user on a Home button of the electronic device 100, an operation of inputting preset fingerprint information by the user to the electronic device 100, and the like.

Further, after the electronic device 100 completes the transaction with the card reader or the POS terminal corresponding to the second NFC application, or after a preset time since the electronic device 100 sets the second NFC application as the default NFC application, the default NFC application of the electronic device 100 is switched to the first NFC application again. For example, the preset time may be 1 minute, 2 minutes, or 30 seconds. The preset time may be set by the user, or the preset time may be a fixed time length preconfigured in the electronic device 100.

For example, it is assumed that the second NFC application is the "bank card" application in the foregoing instance, and the first NFC application is the "bus card" application.

The "bank card" application and the "bus card" application are included in the "wallet" application, and therefore the user may manage the "bank card" application and the "bus card" application in the "wallet" application. For example, the user may set the "bank card" application or the "bus card" application in the "wallet" application as a default NFC application of the electronic device 100.

Figure 6A:
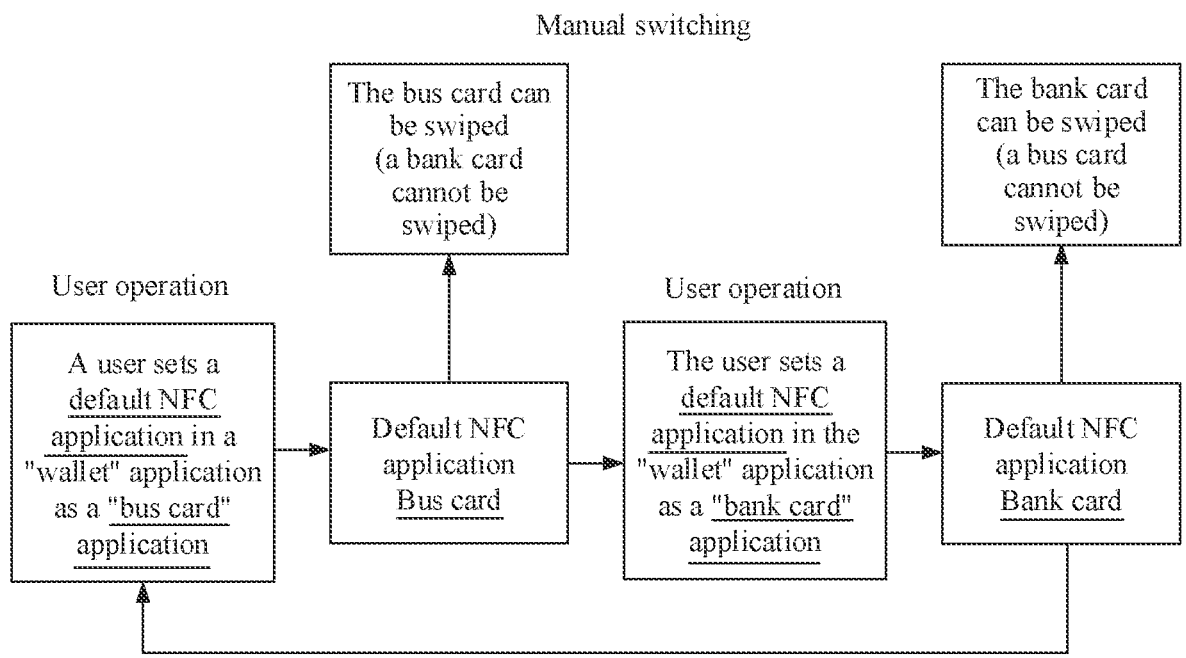
FIG. 6(a) and FIG. 6(b) are another schematic diagram of a switching instance of a default NFC application according to an embodiment of this application.
Figure 6B:
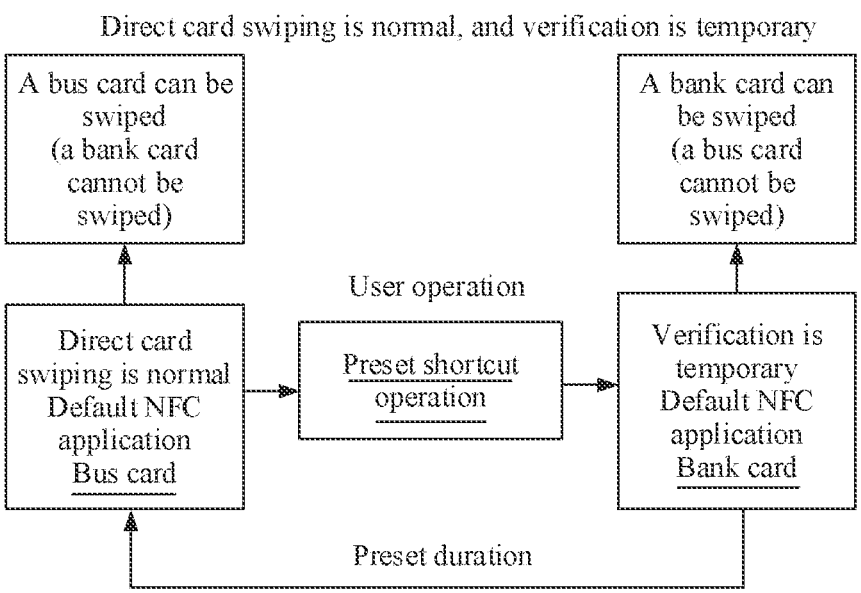

For example, referring to FIG. 6(a), the user may set the "bus card" application as a default NFC application. A method in which the user sets the "bus card" application in the "wallet" application as the default NFC application is not described herein again. After the user sets the "bus card" application as the default NFC application, the "bus card" application may be used as a normal default NFC application of the electronic device 100. If the electronic device 100 is close to a bus POS terminal, the NFCC of the electronic device 100 does not need to perform user verification, and the "bus card" application may execute a transaction instruction to complete the transaction with the bus POS terminal. When the user expects to use the "bank card" application for payment (for example, shopping in a supermarket), the user may input a preset shortcut operation to the electronic device 100, and then place the electronic device 100 close to a supermarket POS terminal. In response to the preset shortcut operation, the electronic device 100 may set the "bank card" application as a temporary default NFC application. Therefore, when the electronic device 100 is close to the supermarket POS terminal, the electronic device 100 may successfully invoke user verification, and after the user verification succeeds, the "bank card" application executes a transaction instruction to complete the transaction with the supermarket POS terminal. Then, after the electronic device 100 completes the transaction with the supermarket POS terminal (not shown in FIG. 6(b)), or after a preset time (for example, 1 minute) since the electronic device 100 sets the "bank card" application to the default NFC application, the default NFC application of the electronic device 100 is switched to the "bus card" application again. In this way, the default NFC application of the electronic device 100 is switched to the "bus card" application in the direct card swiping mode.

In this embodiment of this application, the electronic device 100 may set a first NFC application (for example, the "bus card" application, the "social security card" application, or the "vehicle key" application) in a direct card swiping card as a normal default NFC application, and set a second NFC application (for example, the "bank card" application) in a verification-required mode as a temporary default NFC application. In this way, the user can complete, at any time by using the electronic device 100, a transaction with a card reader or a POS terminal corresponding to the first NFC application. When the user expects to use the second NFC application for payment, the user may input a preset shortcut operation to the electronic device 100. In response to the preset shortcut operation, the electronic device 100 may temporarily set the second NFC application as a default NFC application, so that the electronic device 100 can complete a transaction with a card reader or a POS terminal corresponding to the second NFC application.

It may be understood that one NFC management application may include one first NFC application, or one NFC management application may include a plurality of first NFC applications. For example, a "wallet" application may include a plurality of NFC applications such as a "bus card" application, a "social security card" application, and a "vehicle key" application.

When the "wallet" application includes the plurality of NFC applications such as the "bus card" application, the "social security card" application, and the "vehicle key" application, the electronic device 100 may activate a corresponding NFC application based on an AID in a transaction instruction sent by a card reader or a POS terminal, and the corresponding NFC application executes the transaction instruction to complete the transaction.

It should be noted that, to ensure security of the user verification, the user verification (fingerprint verification shown in FIG. 2 and FIG. 4) may be performed in a trusted execution environment (trust execution environment. TEE). Procedures that have a relatively low security requirement, for example, a procedure in which the user sets the default NFC application and a procedure in which the NFC application registers, may be executed in a rich execution environment (rich execution environment, REE) in which a rich instruction can be executed.

It may be understood that not all NFC applications support use of a first identifier (for example, the AID). For example, the first identifier is the AID. For example, some bus cards do not support use of the AID. Therefore, in some embodiments, the transaction instruction received by the NFCC of the electronic device 100 does not include the AID.

Based on this case, the routing table may include a non-standard card default item. The non-standard card default item is used to point to, when the transaction instruction does not include the AID, an SE (that is, a second target SE) corresponding to current scenario information of the electronic device 100. The electronic device 100 (for example, an NFC management application such as a "wallet" application of the electronic device 100) may store query information of each non-standard NFC application. The query information of the non-standard NFC application may include use scenario information, SE location information, and a second identifier of the non-standard NFC application. The use scenario information of the non-standard NFC application is used to indicate scenario information of using the non-standard NFC application.

The second identifier is used to identify the non-standard NFC application, and the second identifier is not the first identifier (for example, the AID). The second identifier may be a number allocated by the electronic device 100 to the non-standard NFC application.

The use scenario information may include at least one or more of geographical location information, time information, and operation information.

The geographical location information is used to indicate a geographical location at which the non-standard NFC application can be used. For example, a geographical location at which a "bus card" application corresponding to Xi'an can be used is Xi'an, and a geographical location at which a "bus card" application corresponding to Shenzhen can be used is Shenzhen. For another example, a geographical location at which a "social security card" application corresponding to the home can be used is a geographical location corresponding to the home, and a geographical location at which a "vehicle key" application can be used is a garage.

The time information is used to indicate a time for which the corresponding non-standard NFC application can be used. The time information may be a time about which the electronic device 100 collects statistics and for which the user often uses the non-standard NFC application. For example, if the electronic device 100 learns, through statistics collection, that the user often uses the "social security card" application in two time periods, that is, 7:00 to 7:30 and 18:00 to 18:30, time information of the "social security card" application may be 7:00 to 7:30 and 18:00 to 18:30.

The operation information is used to indicate an operation performed by the user on the electronic device 100 before the non-standard NFC application is used. For example, it is assumed that operation information of the "social security card" application may be a double-tap operation performed by the user on a body of the electronic device 100, and operation information of the "vehicle key" application may be a shake operation performed by the user on the body of the electronic device 100.

The SE location information indicates an SE that carries the non-standard NFC application, namely, an SE that is of the electronic device 100 and in which the non-standard NFC application is carried.

For example, the electronic device 100 (for example, a scenario management module 701 shown in FIG. 7) may store one or more pieces of use scenario information, one or more pieces of SE location information, and one or more second identifiers of one or more non-standard NFC applications. For example, the electronic device 100 (for example, the scenario management module 701 shown in FIG. 7) may maintain a non-standard card information table. The non-standard card information table may include query information of a non-standard NFC application installed in the electronic device 100. The query information of the non-standard NFC application may include use scenario information, SE location information, and a second identifier of the non-standard NFC application.

Figure 7:
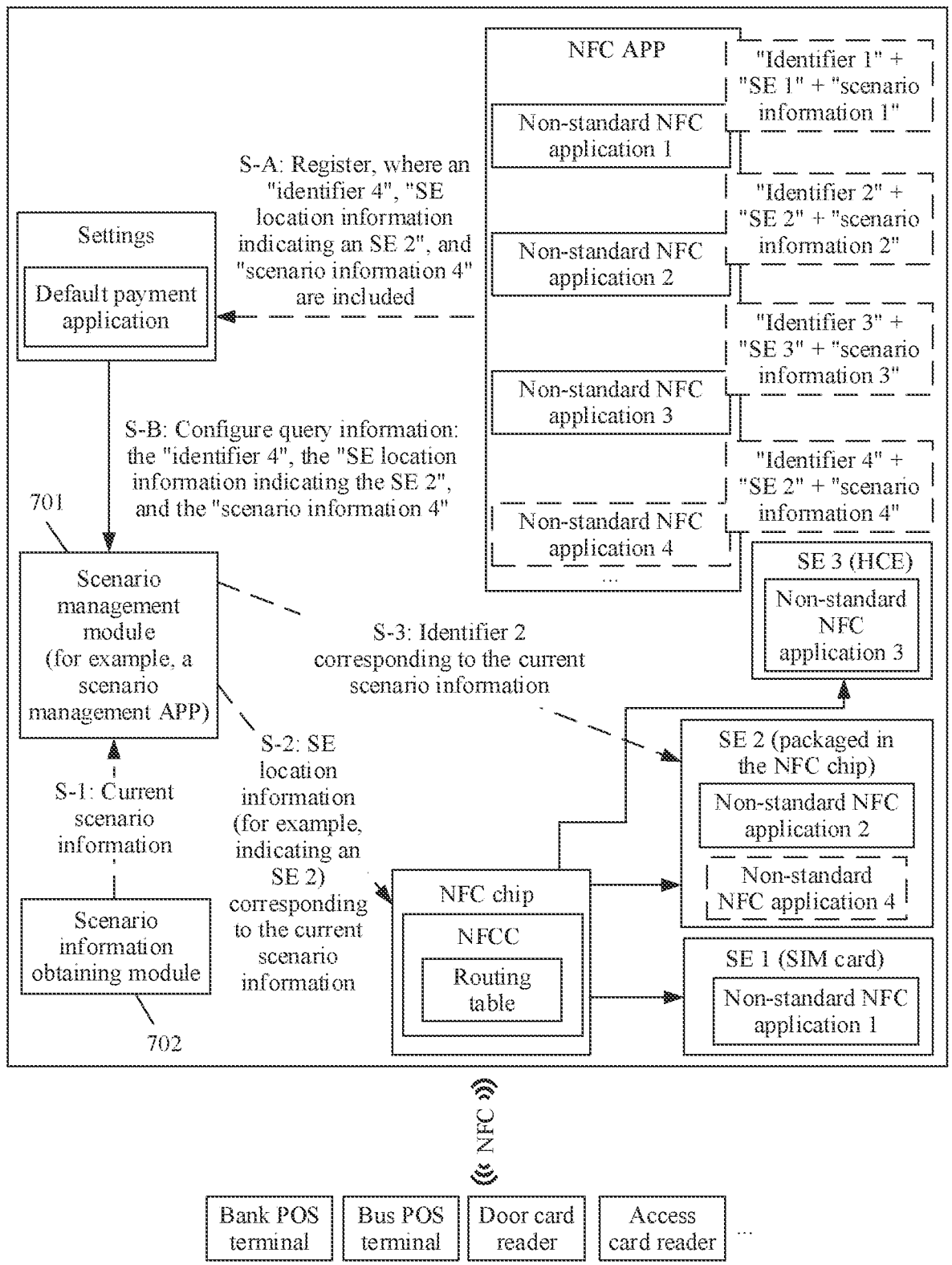
FIG. 7 is another schematic diagram of a switching instance of a default NFC application according to an embodiment of this application.

It should be noted that the query information in the non-standard card information table maintained by the scenario management module 701 shown in FIG. 7 may be configured when a corresponding non-standard NFC application is installed in the electronic device 10. When the non-standard NFC application is installed in the electronic device 100, a method for configuring the query information of the non-standard NFC application in the electronic device 100 (for example, the scenario management module 701 shown in FIG. 7) is described in the following embodiment. The scenario management module 701 in this embodiment of this application may be an NFC management application, for example, the foregoing "wallet" application, configured to manage a plurality of NFC applications.

For example, it is assumed that the electronic device 100 manages three non-standard NFC applications: a non-standard NFC application 1 (for example, a "bus card" application corresponding to Shenzhen), a non-standard NFC application 2 (for example, a "bus card" application corresponding to Xi'an), and a non-standard NFC application 3 (for example, a "bus card" application corresponding to Shanghai) that are shown in FIG. 7. An identifier (for example, a number) of the non-standard NFC application 1 is an identifier 1, the non-standard NFC application 1 is carried in an SE 1, and scenario information of using the non-standard NFC application 1 is scenario information 1. An identifier (for example, a number) of the non-standard NFC application 2 is an identifier 2, the non-standard NFC application 2 is carried in an SE 2, and scenario information of using the non-standard NFC application 2 is scenario information 2. An identifier (for example, a number) of the non-standard NFC application 3 is an identifier 3, the non-standard NFC application 3 is carried in an SE 3, and scenario information of using the non-standard NFC application 3 is scenario information 3.

Table 4 shows an instance of a non-standard card information table according to an embodiment of this application. Table 4 shows query information of the non-standard NFC application 1 (for example, the "bus" application corresponding to Shenzhen), the non-standard NFC application 2 (for example, the "bus" application corresponding to Xi'an), and the non-standard NFC application 3 (for example, the "bus card" application corresponding to Shanghai).

TABLE 4

Non-standard card information table

| Identifier of a non-standard NFC application | Scenario information | SE location information |
|---|---|---|
| Identifier 1 | Scenario information 1 | SE location information 1 (indicating an SE 1) |
| Identifier 2 | Scenario information 2 | SE location information 2 (indicating an SE 2) |
| Identifier 3 | Scenario information 3 | SE location information 3 (indicating an SE 3) |
| ... | ... | ... |

Then, when the electronic device 100 is close to a card reader or a POS terminal, the NFCC of the electronic device 100 may receive a transaction instruction from the card reader or the POS terminal. The transaction instruction may or may not include an AID. Therefore, as shown in FIG. 5A, after receiving the transaction instruction, the NFCC of the electronic device 100 may determine whether the transaction instruction includes the AID. If the transaction instruction does not include the AID, the electronic device 100 may obtain current scenario information of the electronic device 100. The electronic device 100 may search the non-standard card information table for an identifier (for example, the identifier 2) and SE location information (for example, the SE location information indicates the SE 2) that are of the non-standard NFC application and that correspond to the current scenario information. The NFCC of the electronic device 100 configures the non-standard card default item in the routing table to point to an SE (that is, a second target SE, for example, the SE 2) indicated by the found SE location information. In this way, the NFCC of the electronic device 100 may transmit the transaction instruction to the SE (that is, the second target SE, for example, the SE 2) to which the non-standard card default item points.

Further, the electronic device 100 may notify, of the found identifier (for example, the identifier 2) of the non-standard NFC application, the SE (for example, the SE 2) indicated by the SE location information. In this way, after receiving the transaction instruction, the SE (for example, the SE 2) indicated by the SE location information may automatically activate the non-standard NFC application (that is, a second target NFC application) corresponding to the identifier (for example, the identifier 2), and execute the transaction instruction, to complete the transaction.

For example, in this embodiment of this application, the NFC transaction process is described in detail herein with reference to FIG. 7.

First, when the electronic device 100 is close to a card reader or a POS terminal, the NFCC of the electronic device 100 receives a transaction instruction from the card reader or the POS terminal. The NFCC of the electronic device 100 determines that the transaction instruction does not include an AID. A scenario information obtaining module 702 of the electronic device 100 obtains current scenario information of the electronic device 100.

Then, the scenario information obtaining module 702 transmits the current scenario information to the scenario management module 701. The scenario management module 701 searches the non-standard card information table for an identifier (for example, the identifier 2) and SE location information (for example, the SE location information indicates the SE 2) that are of the non-standard NFC application and that correspond to the current scenario information.

Subsequently, the scenario management module 701 may indicate the SE location information to the NFCC, so that the NFCC configures the non-standard card default item in the routing table to point to an SE (for example, the SE 2) indicated by the SE location information. In this way, the NFCC may transmit the transaction instruction to the SE (for example, the SE 2) to which the non-standard card default item points.

In addition, the scenario management module 701 may further notify, of the found identifier (for example, the identifier 2) of the non-standard NFC application, the SE (for example, the SE 2) indicated by the SE location information. In this way, after receiving the transaction instruction, the SE (for example, the SE 2) indicated by the SE location information may automatically activate the non-standard NFC application corresponding to the identifier (for example, the identifier 2), and execute the transaction instruction, to complete the transaction.

The scenario information may include at least one or more of geographical location information, time information, and operation information. In this case, the scenario information obtaining module 702 may include a geographical location obtaining module (for example, a GPS positioning module), a time information obtaining module (for example, a clock and a calendar of the electronic device 100), and the like.

It may be understood that the SE (for example, the SE 2) indicated by the SE location information corresponding to the current scenario information may or may not be an SE to which a route of the NFCC points. After finding the SE location information, the electronic device 100 may determine whether the SE indicated by the SE location information is an SE to which the non-standard card default item in the routing table points. If the SE is the SE to which the non-standard card default item points, the NFCC may directly transmit the received transaction instruction to the SE, and the SE automatically activates the non-standard NFC application indicated by the identifier corresponding to the current scenario information, and executes the transaction instruction, to complete the transaction. If the SE is not the SE to which the non-standard card default item points, the NFCC may configure the non-standard card default item in the routing table to point to the SE, and then transmit the received transaction instruction to the SE, and the SE automatically activates the non-standard NFC application indicated by the identifier corresponding to the current scenario information, and executes the transaction instruction, to complete the transaction.

For example, it is assumed that a default NFC application is the non-standard NFC application 1 shown in FIG. 7, the non-standard NFC application 1 is carried in the SE 1 shown in FIG. 7, and the non-standard card default item in the routing table of the NFCC points to the SE 1.

If the NFCC of the electronic device 100 receives a transaction instruction 3, where the transaction instruction 3 does not include an AID, and the electronic device 100 learns that the current scenario information of the electronic device 100 is the scenario information 2 shown in Table 4, the electronic device 100 may find, from Table 4, the identifier 2 and the SE location information 2 that correspond to the scenario information 2. The identifier 2 is an identifier of the non-standard NFC application 2, and the SE location information 2 indicates the SE 2. In this case, the NFCC of the electronic device 100 may configure the non-standard card default item in the routing table to point to the SE 2. Then, the NFCC transmits the transaction instruction 3 to the SE 2, the SE 2 automatically activates the non-standard NFC application 2 indicated by the identifier 2, and the activated non-standard NFC application 2 executes the transaction instruction 3, to complete the transaction.

If the NFCC of the electronic device 100 receives a transaction instruction 4, where the transaction instruction 4 does not include an AID, and the electronic device 100 learns that the current scenario information of the electronic device 100 is the scenario information 1 shown in Table 4, the electronic device 100 may find, from Table 4, the identifier 1 and the SE location information 1 that correspond to the scenario information 1. The identifier 1 is an identifier of the non-standard NFC application 1, and the SE location information 1 indicates the SE 1. In this case, the NFCC of the electronic device 100 may configure the non-standard card default item in the routing table to point to the SE 1, and directly transmit the transaction instruction 4 to the SE 1, the SE 1 automatically activates the non-standard NFC application 1 indicated by the identifier 1, and the activated non-standard NFC application 1 executes the transaction instruction 4, to complete the transaction.

A method for configuring the non-standard card information table by the electronic device 100 is described herein in this embodiment of this application.

In some embodiments, when an NFC application is installed, query information that corresponds to the NFC application and that is in the non-standard card information table shown in Table 4 may be configured according to a route configuration command delivered by the DH of the electronic device 100. The query information of the non-standard NFC application may include an identifier, SE location information, and scenario information of the non-standard NFC application.

Specifically, when a non-standard NFC application (for example, a non-standard NFC application 4 shown in FIG. 7) is installed, the NFC application is downloaded to an SE (for example, the SE 2) of the electronic device 100. After determining that the non-standard NFC application is successfully downloaded to the SE (for example, the SE 2) of the electronic device 100, the SE may send, to the DH of the electronic device 100, a message used to indicate that the non-standard NFC application is successfully downloaded. In response to the message, the DH of the electronic device 100 may register the non-standard NFC application (for example, the non-standard NFC application 4 shown in FIG. 7) with a default payment application (that is, perform S-A shown in FIG. 7). When registering, in response to the message, the non-standard NFC application 4 shown in FIG. 7 with the default payment application, the DH may configure, in the default payment application, an identifier 4, SE location information indicating an SE 4, and scenario information 4 of the non-standard NFC application 4. Finally, the DH of the electronic device 100 may configure, in the non-standard card information table maintained by the scenario management module 701, query information of the non-standard NFC application (for example, the non-standard NFC application 4 shown in FIG. 7) (that is, perform S-B shown in FIG. 7). For example, the query information of the non-standard NFC application 4 is query information (an identifier 4, SE location information 4, and scenario information 4) in a non-standard card information table shown in Table 5. In this way, the query information of the non-standard NFC application 4 is configured, and subsequently, whether a transaction instruction needs to access the NFC application may be determined by using the query information.

TABLE 5

Non-standard card information table

| identifier of a non-standard NFC application | Scenario information | SE location information |
|---|---|---|
| Identifier 1 | Scenario information 1 | SE location information 1 (indicating an SE 1) |
| Identifier 2 | Scenario information 2 | SE location information 2 (indicating an SE 2) |
| Identifier 3 | Scenario information 3 | SE location information 3 (indicating an SE 3) |
| Identifier 4 | Scenario information 4 | SE location information 4 (indicating the SE 2) |
| ... | ... | ... |

It should be noted that scenario information of some non-standard NFC applications is configured in the foregoing manner when the non-standard NFC application is downloaded. For example, geographical location information of a "bus card" application corresponding to each place is configured when the "bus card" application is downloaded. The scenario information of some non-standard NFC applications is scenario information (for example, geographical location information and/or time information) that is obtained by the electronic device 100 through statistics collection and that indicates that the user often uses the non-standard NFC application after the user uses the non-standard NFC card for a period of time. For example, scenario information of a "social security card" application is scenario information that is obtained by the electronic device 100 through statistics collection and that indicates that the user often uses the "social security card" application after the user uses the "social security card" application for a period of time.

Figure 8:
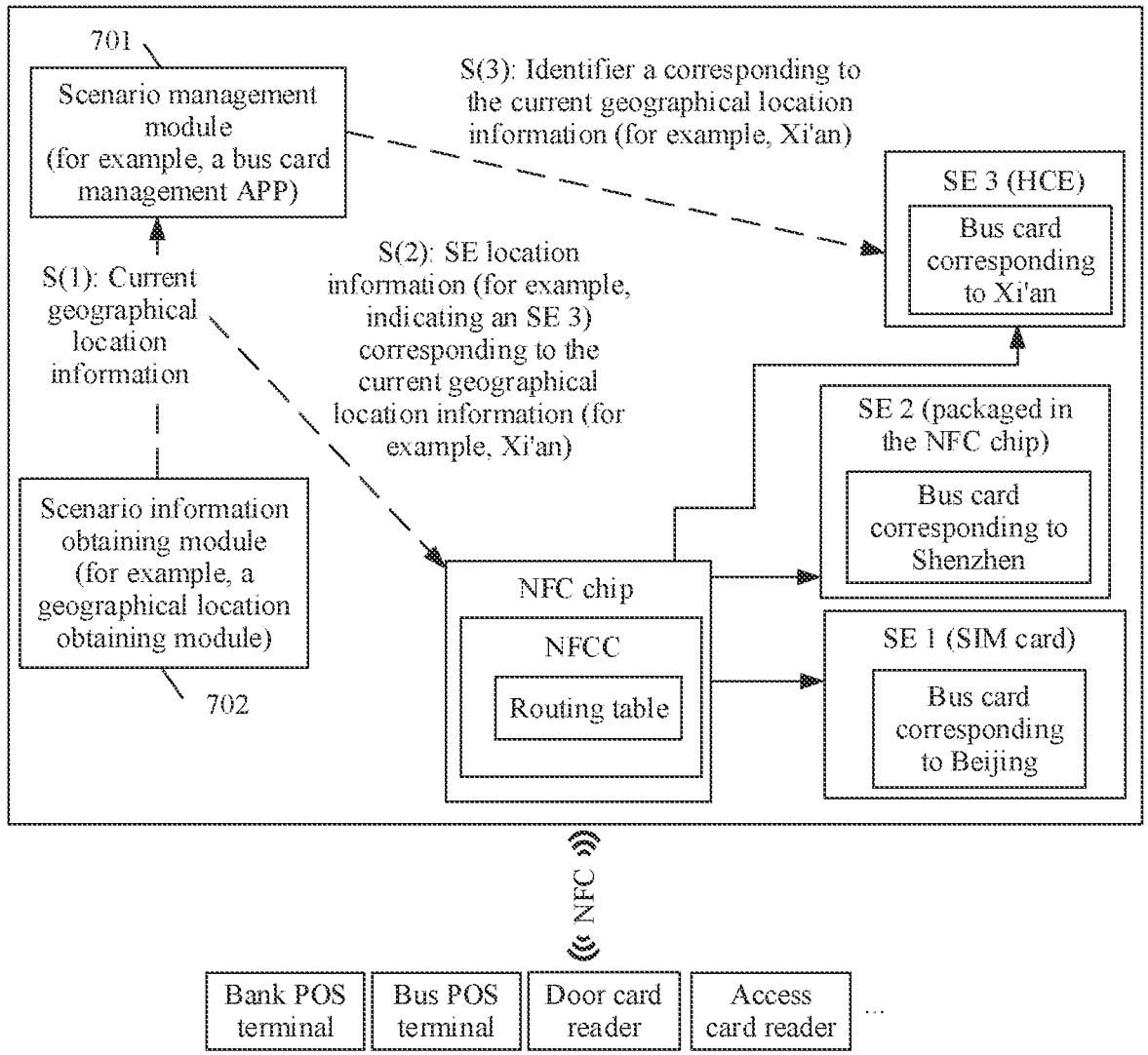
FIG. 8 is another schematic diagram of a switching instance of a default NFC application according to an embodiment of this application.

In some embodiments, for example, the scenario information is the geographical location information. As shown in FIG. 8, a "bus card" application corresponding to Beijing is carried in an SE 1, a "bus card" application corresponding to Shenzhen is carried in an SE 2, and a "bus card" application corresponding to Xi'an is carried in an SE 3. The "bus card" application corresponding to Beijing, the "bus card" application corresponding to Shenzhen, and the "bus card" application corresponding to Xi'an are all non-standard NFC applications and do not support an AID. An identifier of the "bus card" application corresponding to Xi'an is an identifier a, geographical location information of the "bus card" application corresponding to Xi'an is Xi'an, and SE location information of the "bus card" application corresponding to Xi'an indicates that the "bus card" application corresponding to Xi'an is carried in an SE 3.

When a user holds the electronic device 100 close to a POS terminal on a bus, the NFCC of the electronic device 100 may receive a transaction instruction sent by the POS terminal. After receiving the transaction instruction, the electronic device 100 may obtain information about a geographical location at which the user is currently located. If the obtained geographical location indicates that the user is currently in Xi'an, the NFCC of the electronic device 100 may transmit the received transaction instruction to the SE 3, and the SE 3 automatically activates the "bus card" application corresponding to Xi'an, and executes the transaction instruction, for example, deducts a corresponding amount from the "bus card" application corresponding to Xi'an.

For example, as shown in FIG. 8, the scenario information obtaining module (for example, a geographical location obtaining module) 702 may obtain current geographical location information, and perform S(1) of sending the current geographical location information to the scenario management module (for example, a bus card management APP, that is, an NFC management application) 701. The scenario management module (for example, the bus card management APP, that is, the NFC management application) 701 may search the non-standard card information table for the identifier a and the SE location information indicating the SE 3 that are of the "bus card" application that corresponds to Xi'an and that corresponds to the geographical location information "Xi'an". Subsequently, the scenario management module 701 may indicate the SE location information to the NFCC, so that the NFCC configures the non-standard card default item in the routing table to point to the SE 3 indicated by the SE location information. In this way, the NFCC may transmit the transaction instruction to the SE 3 to which the non-standard card default item points. In addition, the scenario management module 701 may further notify the SE 3 of the found identifier a of the "bus card" application corresponding to Xi'an. In this way, after receiving the transaction instruction, the SE 3 may automatically activate the "bus card" application that corresponds to Xi'an and that corresponds to the identifier a, and execute the transaction instruction, to complete the transaction.

In some embodiments, for example, the scenario information includes the geographical location information and the time information. It is assumed that a "vehicle key" application is carried in an SE 1 in a form of a SIM card. The electronic device 100 learns, through statistics collection, that the user often uses the "vehicle key" application at a geographical location 1 (for example, an underground garage 1) in a time period from 7:30 to 7:50. In this case, if the NFCC receives a transaction instruction, the NFCC may automatically activate the "vehicle key" application 301 when the NFCC learns that a current system time (or a time for which the NFCC receives the transaction instruction) is in a time period from 7:30 to 7:50 and the electronic device 100 is located at the geographical location 1. To be specific, when the current system time is in the time period from 7:30 to 7:50 and the electronic device 100 is located at the geographical location 1, the SE 1 to which the non-standard card default item points may automatically run the "vehicle key" application. In this way, when the user approaches a vehicle door by using the electronic device 100, the vehicle door can be opened without manually activating the "vehicle key" application by the user.

According to the automatic routing method for an SE provided in this embodiment of this application, even if some NFC applications do not support the AID, after receiving the transaction instruction, the electronic device 100 can be automatically routed, based on the current scenario information of the electronic device 100, to an SE in which a non-standard NFC application to be accessed by the transaction instruction is located.

In the embodiments of this application, the electronic device may be divided into functional modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division in an actual implementation.

The scenario management module 701 and the scenario information obtaining module 702 in the foregoing method embodiment may be integrated into a processor (for example, the processor 310) of the electronic device 100 for implementation.

An embodiment of this application provides an NFC chip. The NFC chip includes an NFCC (that is, an NFC controller); and the NFCC stores first identifiers and secure element SE location information of a plurality of NFC applications, and the SE location information indicates an SE that carries a corresponding NFC application. The NFCC receives a transaction instruction. The NFCC searches, in response to a fact that the transaction instruction carries a first identifier, the SE location information stored in the NFC controller for SE location information corresponding to the first identifier carried in the transaction instruction. The NFCC determines a first target SE from at least two SEs based on the found SE location information. The NFCC sends the transaction instruction to the first target SE. For example, the first identifier may be an AID.

Further, the NFCC is further configured to: when downloading a first target NFC application, store a first identifier of the first target NFC application and SE location information of the first target NFC application, where the SE location information of the first target NFC application indicates the first target SE that carries the first target NFC application.

Further, that the NFCC sends the transaction instruction to the first target SE includes: The NFCC is specifically configured to: if the first target SE is an SE to which a route of the NFCC points, directly send, by the NFCC, the transaction instruction to the first target SE; or if the first target SE is not an SE to which a route of the NFCC points, modify, by the NFCC, the route to point to the first target SE, and then send the transaction instruction to the first target SE.

Further, the NFCC stores a routing table, where the routing table includes the first identifiers and the SE location information of the plurality of NFC applications. The routing table further includes a non-standard card default item, and the non-standard card default item is used to point to, when the transaction instruction does not carry the first identifier, an SE corresponding to current scenario information of the electronic device. The NFCC is further configured to: when the transaction instruction does not carry the first identifier, receive indication information used to indicate a second target SE; and configure the non-standard card default item to point to the second target SE. The NFCC is further configured to send the transaction instruction to the second target SE to which the non-standard card default item points.

Further, that the NFCC is further configured to send the transaction instruction to the second target SE to which the non-standard card default item points includes: The NFCC is specifically configured to: if the second target SE is an SE to which the non-standard card default item points, directly send, by the NFCC, the transaction instruction to the second target SE to which the non-standard card default item points; or if the second target SE is not an SE to which the non-standard card default item points, configure, by the NFCC, the non-standard card default item in the routing table to point to the second target SE, and then send the transaction instruction to the second target SE to which the non-standard card default item points.

An embodiment of this application further provides a computer storage medium. The computer storage medium may include computer instructions. When the computer instructions are run on an electronic device, the electronic device is enabled to perform the automatic routing method for an SE or the automatic activation method for an NFC application.

An embodiment of this application further provides a computer program product. When the computer program product runs on a computer, the computer is enabled to perform the automatic routing method for an SE or the automatic activation method for an NFC application.

Based on the foregoing descriptions of the implementations, a person skilled in the art may clearly understand that for the purpose of convenient and brief descriptions, division into the foregoing functional modules is merely used as an example for illustration. In actual application, the foregoing functions can be allocated to different functional modules for implementation based on a requirement, that is, an inner structure of an apparatus is divided into different functional modules to implement all or some of the functions described above. For a detailed working process of the foregoing system, apparatus, and unit, refer to a corresponding process in the foregoing method embodiments. Details are not described herein again.

In the several embodiments provided in the embodiments of this application, it should be understood that the disclosed system, apparatus, and method may be implemented in another manner. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions in the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in the embodiments. The foregoing storage medium includes any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of this application. Any variation or replacement within the technical scope disclosed in the embodiments of this application shall fall within the protection scope of this application. Therefore, the protection scope of this application shall be subject to the protection scope of the claims.

What is claimed is:

1. An electronic device comprising:
at least two secure elements (SEs), wherein each of the at least two SEs carries at least one near field communication (NFC) application; and
an NFC controller configured to:
store first identifiers and first secure element (SE) location information of a plurality of NFC applications, wherein the first SE location information indicates an SE that carries a corresponding NFC application;
receive a transaction instruction;
search, in response to the transaction instruction carrying a second identifier from among the first identifiers, a second SE location information, from the first SE location information, corresponding to the second identifier;
determine a first target SE from the at least two SEs based on the second SE location information; and
send the transaction instruction to the first target SE.

2. The electronic device of claim 1, wherein the NFC controller is further configured to determine, based on the second identifier, a first target NFC application from the NFC applications carried in the first target SE, and wherein the first target SE is configured to:
receive the transaction instruction; and
run the first target NFC application to execute the transaction instruction.

3. The electronic device of claim 1, wherein the first identifier is an application identifier (AID).

4. The electronic device of claim 2, wherein an NFC management application of the first target NFC application is configured to manage one or more NFC applications, and carries a third identifier of the first target NFC application and third SE location information of the first target NFC application, wherein the third SE location information indicates the first target SE that carries the first target NFC application, and wherein the NFC controller is further configured to:
receive the third identifier and the third SE location information that are transmitted when the NFC management application registers with a default payment application of the electronic device; and
store the third identifier and the third SE location information.

5. The electronic device according to claim 1, wherein the electronic device further comprises a processor configured to:
store use scenario information, fourth SE location information, and a fourth identifier of non-standard NFC applications, wherein the non-standard NFC application does not support an application identifier (AID), wherein the fourth identifier identifies the non-standard NFC application, wherein the fourth identifier is not the second identifier, and wherein the use scenario information indicates scenario information of a corresponding non-standard NFC application;
obtain current scenario information of the electronic device in response to that the transaction instruction received by the NFC controller does not carry the second identifier;
search the use scenario information of the non-standard NFC application for use scenario information corresponding to the current scenario information;
determine the fourth identifier and the fourth SE location information that correspond to the use scenario information;
determine a second target SE from the at least two SEs based on the fourth SE location information;
send the transaction instruction to the second target SE; and
indicate the fourth dentifier to the second target SE, wherein the the second target SE is configured to:
receive the transaction instruction;
determine, based on the fourth identifier, a second target NFC application from NFC applications carried in the second target SE, wherein the second target NFC application is a non-standard NFC application; and
run the second target NFC application to execute the transaction instruction.

6. The electronic device claim 5, wherein
the processor is further configured to indicate the second target SE to the NFC controller, and wherein the NFC controller is configured to:
store a routing table comprising the first identifiers, the first SE location information, a non-standard card default item, wherein the non-standard card default item points to an SE corresponding to the current scenario information wherein the transaction instruction does not carry the second identifier;
configure, in response to the indication of the processor, the non-standard card default item to point to the second target SE; and
send the transaction instruction to the second target SE to which the non-standard card default item points.

7. The electronic device of claim 5, wherein the scenario information comprises at least one or more of:
geographical location information indicating a geographical location at which the corresponding non-standard NFC application can be used;
time information indicating a time for which the corresponding non-standard NFC application can be used; and
operation information indicating an operation performed by a user on the electronic device before the corresponding non-standard NFC application is used.

8. The electronic device of claim 1, wherein a first SE in the at least two SEs carries a first NFC application and a second NFC application, wherein a first NFC service verification manner supported by the first NFC application is a direct card swiping mode in which user verification does not need to be performed, wherein a second NFC service verification manner supported by the second NFC application is a verification-required mode in which the user verification needs to be performed, wherein the user verification comprises a password verification, fingerprint verification, face verification, iris authentication, voiceprint authentication, or behavior authentication, and wherein the processor is further configured to:
activate the first NFC application, in response to a setting operation of the user, to set the first NFC application as a default NFC application of the electronic device; and
in response to a preset shortcut operation of the user,
deactivate the first NFC application, and
automatically activate the second NFC application to set the second NFC application as the default NFC application.

9. An electronic device comprising:
at least two secure elements SEs, wherein a first SE in the at least two SEs carries a first near field communication (NFC) application and a second NFC application, wherein a first NFC service verification manner supported by the first NFC application is a direct card swiping mode in which user verification does not need to be performed, and wherein a second NFC service verification manner supported by the second NFC application is a verification-required mode in which the user verification needs to be performed; and
a processor configured to:
activate the first NFC application, in response to a setting operation of a user, to set the first NFC application as a default NFC application of the electronic device; and
in response to a preset shortcut operation of the user,
deactivate the first NFC application, and
automatically activate the second NFC application to set the second NFC application as the default NFC application.

10. The electronic device of claim 9, wherein the user verification comprises password verification or fingerprint verification.

11. The electronic device of claim 9, wherein the user verification comprises face verification or iris authentication.

12. The electronic device of claim 9, wherein the user verification comprises voiceprint authentication or behavior authentication.

13. An automatic routing method for a near field communication (NFC) application secure element (SE) applied to an electronic device, wherein the electronic device comprises at least two secure elements (SEs), wherein each of the at least two SEs carries at least one NFC application, and configure to store first identifiers and first SE location information of a plurality of NFC applications, and wherein the automatic routing method comprises:
receiving a transaction instruction;
searching, response to the transaction instruction carrying a second identifier from among the first identifiers, second SE location informatin, from the first SE location information, corresponding to the second identifier; and
determining, a first target SE from the at least two SEs based on the second SE location information, wherein an NFC application in the first target SE executes the transaction instruction.

14. The automatic routing method of claim 13, further comprising:
determining, based on the second identifier, a first target NFC application from NFC applications carried in the first target SE; and
running the first target NFC application by using the first target SE to execute the transaction instruction.

15. The automatic routing method of claim 13, wherein the first identifier is an application identifier (AID).

16. The automatic routing method of claims 13, wherein an NFC management application of the first target NFC application is configured to manage the NFC applications, and carries a third identifier of the first target NFC application and third SE location information of the first target NFC application, wherein the third SE location information indicates the first target SE that carries the first target NFC application, and wherein the automatic routing method further comprises:
- obtaining the third identifier and the third SE location information that are transmitted when the NFC management application registers with a default payment application of the electronic device; and
- storing, the third identifier and the third SE location information.

17. The automatic routing method according of claim 13, wherein the electronic device is further configured to store use scenario information, fourth SE location information, and a fourth identifier of a non-standard NFC application, wherein the non-standard NFC application does not support the AID, wherein the fourth identifier identifies the non-standard NFC application and is not the second identifier, and wherein the use scenario information indicates scenario information of a corresponding non-standard NFC application, and wherein the automatic routing method further comprises:
- obtaining current scenario information of the electronic device in response to that the transaction instruction does not carry the second identifier;
- searching the use scenario information corresponding to the current scenario information;
- determining the fourth identifier and the fourth SE location information that correspond to the use scenario information;
- determining a second target SE from the at least two SEs based on the fourth SE location information;
- determining, based on the fourth identifier, a second target NFC application from NFC applications carried in the second target SE; and
- running the second target NFC application using the second target SE to execute the transaction instruction.

18. The automatic routing method according to claim 17, wherein the electronic device is further configured to store a routing table comprising the first identifiers, the first SE location information, and a non-standard card default item, wherein the non-standard card default item points to an SE corresponding to the current scenario information when the transaction instruction does not carry the first identifier, and wherein the automatic routing method further comprises configuring the non-standard card default item to point to the second target SE.

19. The automatic routing method of claim 17, wherein the scenario information comprises at least one or more of:
- geographical location information indicating a geographical location at which the corresponding non-standard NFC application can be used;
- time information indicating a time for which the corresponding non-standard NFC application can be used; and
- operation information indicating an operation performed by a user on the electronic device before the corresponding non-standard NFC application is used.

20. The automatic routing method of claim 10, wherein a first SE in the at least two SEs carries a first NFC application and a second NFC application, wherein a first NFC service verification manner supported by the first NFC application is a direct card swiping mode in which user verification does not need to be performed, wherein a second NFC service verification manner supported by the second NFC application is a verification-required mode in which the user verification needs to be performed, wherein the user verification comprises password verification, fingerprint verification, face verification, iris authentication, voiceprint authentication, or behavior authentication, and wherein the automatic routing method comprises:
- activating the first NFC application, in response to a setting operation of the user, to set the first NFC application as a default NFC application of the electronic device; and
- in response to a preset shortcut operation of the user,
  - deactivating the first NFC application, and
  - automatically activating the second NFC application to set the second NFC application as the default NFC application.

* * * * *

UNITED STATES PATENT AND TRADEMARK OFFICE
CERTIFICATE OF CORRECTION

PATENT NO. : 11,966,910 B2
APPLICATION NO. : 17/440530
DATED : April 23, 2024
INVENTOR(S) : Zhuofei Li and Jiahao Zhen It is certified that error appears in the above-identified patent and that said Letters Patent is hereby corrected as shown below:

In the Claims

Claim 5, Column 36, Line 64: "applications, wherein the non-standard NFC applica-" should read "application, wherein the non-standard NFC applica-"

Claim 6, Column 37, Line 29: "The electronic device claim 5, wherein" should read "The electronic device of claim 5, wherein"

Claim 6, Column 37, Line 37: "scenario information wherein the transaction instruc-" should read "scenario information when the transaction instruc-"

Claim 8, Column 37, Line 64: "cation comprises a password verification, fingerprint verifi-" should read "cation comprises password verification, fingerprint verifi-"

Claim 13, Column 38, Line 44: "configure to store first identifiers and first SE location" should read "configured to store first identifiers and first SE location"

Claim 16, Column 38, Line 66: "The automatic routing method of claims 13, wherein" should read "The automatic routing method of claim 13, wherein"

Signed and Sealed this
Fourth Day of June, 2024

Katherine Kelly Vidal
*Director of the United States Patent and Trademark Office*